United States Patent
Romack et al.

(10) Patent No.: US 10,350,647 B2
(45) Date of Patent: Jul. 16, 2019

(54) INTEGRATED AUTOMOTIVE SYSTEM, NOZZLE ASSEMBLY AND REMOTE CONTROL METHOD FOR CLEANING AN IMAGE SENSOR'S EXTERIOR OR OBJECTIVE LENS SURFACE

(71) Applicant: DLHBOWLES, INC., Canton, OH (US)

(72) Inventors: Alan Romack, Columbia, MD (US); Keith Berning, Jessup, MD (US); Russell Hester, Odenton, MD (US); Evan Hartranft, Baltimore, MD (US); Robert Bower, New Market, MD (US); Srinivasaiah Sridhara, Ellicott City, MD (US); Eric Koehler, Woodstock, MD (US)

(73) Assignee: DLHBOWLES, INC., Canton, OH (US)

( * ) Notice: Subject to any disclaimer, the term of this patent is extended or adjusted under 35 U.S.C. 154(b) by 728 days.

(21) Appl. No.: 14/320,734

(22) Filed: Jul. 1, 2014

(65) Prior Publication Data

US 2016/0001330 A1    Jan. 7, 2016
US 2018/0339313 A9    Nov. 29, 2018

Related U.S. Application Data

(62) Division of application No. 14/004,269, filed as application No. PCT/US2012/028828 on Mar. 10, 2012.

(Continued)

(51) Int. Cl.
*B08B 3/02*    (2006.01)
*B60S 1/52*    (2006.01)
(Continued)

(52) U.S. Cl.
CPC ............ *B08B 3/02* (2013.01); *B05B 1/08* (2013.01); *B60R 11/04* (2013.01); *B60S 1/52* (2013.01);
(Continued)

(58) Field of Classification Search
CPC ......... B08B 3/02; B60R 11/04; B60S 1/0848; B60S 1/52; B60S 1/56; G02B 27/0006; H04N 5/2252; H04N 5/2254
See application file for complete search history.

(56) References Cited

U.S. PATENT DOCUMENTS 4,463,904 A    8/1984    Bray, Jr.
4,508,267 A    4/1985    Stouffer
(Continued)

FOREIGN PATENT DOCUMENTS

CN    203157944    8/2013
CN    203713824    7/2014
(Continued)

OTHER PUBLICATIONS

International Searching Authority, U.S. Patent Office, International Search Report and Written Opinion for International App. No. PCT/US2015/025489 dated Jul. 16, 2015.
(Continued)

*Primary Examiner* — Md N Haque
(74) *Attorney, Agent, or Firm* — McDonald Hopkins LLC

(57) ABSTRACT

An external lens washing system has an aiming fixture configured to support and constrain an external lens which is exposed to the elements and apt to become soiled with debris. A nozzle assembly is configured to be supported and aimed toward the external lens by the aiming fixture and has at least one laterally offset washing nozzle projecting from the aiming fixture to a spray washing fluid toward the external lens surface, spraying at a shallow, glancing spray
(Continued)

aiming angle to impinge upon and wash the lens external surface. Optionally, an integrated image sensor and lens washing assembly is configured for use with a remote control method for cleaning an exterior objective lens surface and includes a sealed image sensor housing assembly including an integral, remotely controllable lens cleaning system with an optimized configuration for aiming one or more cleansing sprays from one or more laterally offset fluidic oscillators.

12 Claims, 16 Drawing Sheets

Related U.S. Application Data

(60) Provisional application No. 61/451,492, filed on Mar. 10, 2011.

(51) Int. Cl.
  *B60S 1/56* (2006.01)
  *B60R 11/04* (2006.01)
  *G02B 27/00* (2006.01)
  *H04N 5/225* (2006.01)
  *B05B 1/08* (2006.01)
  *B60S 1/62* (2006.01)
  *B60S 3/04* (2006.01)
  *H04N 7/18* (2006.01)
  *B60S 1/08* (2006.01)

(52) U.S. Cl.
  CPC .. *B60S 1/56* (2013.01); *B60S 1/62* (2013.01); *B60S 3/04* (2013.01); *G02B 27/0006* (2013.01); *H04N 5/2252* (2013.01); *H04N 5/2254* (2013.01); *H04N 7/185* (2013.01); *B60S 1/0848* (2013.01)

(56) References Cited

U.S. PATENT DOCUMENTS

| | | |
|---|---|---|
| 5,546,630 A | 8/1996 | Long |
| 5,550,677 A | 8/1996 | Schofield |
| 5,670,935 A | 9/1997 | Schofield |
| 5,724,187 A | 3/1998 | Varaprasad |
| 5,749,525 A | 5/1998 | Stouffer |
| 5,760,962 A | 6/1998 | Schofield |
| 5,796,094 A | 8/1998 | Schofield |
| 5,854,708 A | 12/1998 | Komatsu |
| 5,877,897 A | 3/1999 | Schofield |
| 5,949,331 A | 9/1999 | Schofield |
| 6,013,372 A | 1/2000 | Hayakawa |
| 6,071,606 A | 6/2000 | Yamazaki |
| 6,097,023 A | 8/2000 | Schofield |
| 6,189,808 B1 | 2/2001 | Daniels |
| 6,193,378 B1 | 2/2001 | Tonar |
| 6,201,642 B1 | 3/2001 | Bos |
| 6,222,447 B1 | 4/2001 | Schofield |
| 6,253,782 B1 | 7/2001 | Raghu |
| 6,257,500 B1 | 7/2001 | Petzold |
| 6,302,545 B1 | 10/2001 | Schofield |
| 6,396,397 B1 | 5/2002 | Bos |
| 6,498,620 B2 | 12/2002 | Schofield |
| 6,523,964 B2 | 2/2003 | Schofield |
| RE38,013 E | 3/2003 | Stouffer |
| 6,554,210 B2 | 4/2003 | Holt |
| 6,611,202 B2 | 8/2003 | Schofield |
| 6,626,377 B1 | 9/2003 | Vogt |
| 6,690,268 B2 | 2/2004 | Schofield |
| 6,708,899 B2 | 3/2004 | Nakano |
| 6,717,610 B1 | 4/2004 | Bos |
| 6,757,109 B2 | 6/2004 | Bos |
| 6,834,904 B2 | 12/2004 | Sauvonnet |
| 6,834,906 B2 | 12/2004 | Vaitus |
| 7,005,974 B2 | 2/2006 | McMahon |
| 7,014,131 B2 | 3/2006 | Berning |
| 7,038,577 B2 | 5/2006 | Pawlicki |
| 7,267,290 B2 | 9/2007 | Gopalan |
| 7,339,149 B1 | 3/2008 | Schofield |
| 7,506,823 B2 | 3/2009 | Eisele |
| 7,563,505 B2 | 7/2009 | Reihs |
| 7,726,821 B2 | 6/2010 | Bral |
| 7,965,336 B2 | 6/2011 | Bingle |
| 7,982,767 B2 | 7/2011 | Berson |
| 8,149,327 B2 | 4/2012 | Lin |
| 8,186,608 B2 | 5/2012 | Rathey |
| 8,454,245 B2 | 6/2013 | Overskeid |
| 8,567,963 B1 | 10/2013 | Criscuolo |
| 8,671,504 B2 | 3/2014 | Ono |
| 8,792,003 B2 | 7/2014 | Nakamura |
| 8,985,480 B2 | 3/2015 | Kikuta |
| 9,126,534 B2 | 9/2015 | Snider |
| 9,180,840 B2 | 11/2015 | Tanaka |
| 9,217,864 B2 | 12/2015 | Bell |
| 9,221,430 B2 | 12/2015 | Kikuta |
| 9,278,670 B2 | 3/2016 | Hattori |
| 9,319,637 B2 | 4/2016 | Lu |
| 9,452,739 B2 | 9/2016 | Kikuta |
| 9,454,003 B1 | 9/2016 | Li |
| 9,464,982 B2 | 10/2016 | Tokhtuev |
| 9,505,382 B2 | 11/2016 | Gokan |
| 9,538,054 B2 | 1/2017 | Hayakawa |
| 9,539,988 B2 | 1/2017 | Hsiao |
| 9,607,242 B2 | 3/2017 | Lavoie |
| 9,616,856 B2 | 4/2017 | Irie |
| 9,625,714 B2 | 4/2017 | Rousseau |
| 9,663,073 B2 | 5/2017 | Tanaka |
| 9,707,896 B2 | 7/2017 | Boegel |
| 9,746,666 B2 | 8/2017 | Eineren |
| 9,796,359 B2 | 10/2017 | Field |
| 9,796,361 B2 | 10/2017 | Gokan |
| 9,804,386 B2 | 10/2017 | Hayakawa |
| 9,862,321 B2 | 1/2018 | Henion |
| 2003/0124360 A1 | 7/2003 | Reihs |
| 2004/0124659 A1* | 7/2004 | Vaitus ............... B60J 5/101 296/106 |
| 2004/0189831 A1 | 9/2004 | Shibatani |
| 2004/0200027 A1 | 10/2004 | Sugihara |
| 2005/0129394 A1 | 6/2005 | Ichikawa |
| 2006/0091242 A1* | 5/2006 | Gopalan ............ B05B 1/08 239/589.1 |
| 2006/0157591 A1 | 7/2006 | Eisele |
| 2006/0289678 A1 | 12/2006 | Sakai |
| 2007/0132610 A1 | 6/2007 | Guemalec |
| 2008/0081108 A1 | 4/2008 | Yamada |
| 2008/0210780 A1 | 9/2008 | Discher |
| 2009/0250533 A1* | 10/2009 | Akiyama ........... B60S 1/58 239/284.1 |
| 2010/0230991 A1 | 9/2010 | Fioravanti |
| 2011/0061692 A1 | 3/2011 | Gopalan |
| 2011/0073142 A1 | 3/2011 | Hattori |
| 2011/0147479 A1 | 6/2011 | Overskeid |
| 2011/0266375 A1 | 11/2011 | Ono |
| 2011/0292212 A1* | 12/2011 | Tanabe ............... B05B 1/08 348/148 |
| 2012/0117745 A1 | 5/2012 | Hattori |
| 2012/0133768 A1 | 5/2012 | Stephan |
| 2012/0162428 A1* | 6/2012 | Wee .................. B60R 1/0602 348/148 |
| 2012/0266922 A1 | 10/2012 | Krahn |
| 2013/0092758 A1 | 4/2013 | Tanaka |
| 2013/0142026 A1 | 6/2013 | Matsumura |
| 2013/0146577 A1* | 6/2013 | Haig ................. B60H 1/0025 219/202 |
| 2013/0209079 A1 | 8/2013 | Alexander |
| 2013/0255023 A1 | 10/2013 | Kikuta |
| 2013/0319486 A1 | 12/2013 | Kikuta |
| 2014/0060582 A1* | 3/2014 | Hartranft ........... B05B 1/06 134/18 |
| 2015/0090291 A1 | 4/2015 | Na |
| 2015/0138357 A1 | 5/2015 | Romack |
| 2015/0166020 A1 | 6/2015 | Kong |

(56) References Cited

U.S. PATENT DOCUMENTS

| | | |
|---|---|---|
| 2015/0203077 A1 | 7/2015 | Gokan |
| 2015/0298657 A1 | 10/2015 | Kanter |
| 2015/0329083 A1 | 11/2015 | Kiyohara |
| 2015/0343999 A1 | 12/2015 | Lopez Galera |
| 2015/0353024 A1 | 12/2015 | Cooper |
| 2016/0001330 A1 | 1/2016 | Romack |
| 2016/0101735 A1 | 4/2016 | Trebouet |
| 2016/0176384 A1 | 6/2016 | Dissette |
| 2016/0264064 A1 | 9/2016 | Byrne |
| 2016/0311405 A1 | 10/2016 | Richardson |
| 2017/0021810 A1 | 1/2017 | Trebouet |
| 2017/0036647 A1 | 2/2017 | Zhao |
| 2017/0036650 A1 | 2/2017 | Hester |
| 2017/0182980 A1 | 6/2017 | Davies |
| 2017/0210304 A1 | 7/2017 | Davies |
| 2017/0225660 A1 | 8/2017 | Trebouet |
| 2017/0239693 A1 | 8/2017 | Nabavi |
| 2017/0274823 A1 | 9/2017 | Call |
| 2017/0297536 A1 | 10/2017 | Giraud |
| 2017/0297540 A1 | 10/2017 | Zhang |
| 2017/0313286 A1 | 11/2017 | Galera |
| 2017/0341597 A1 | 11/2017 | Buss |
| 2018/0015907 A1 | 1/2018 | Rice |

FOREIGN PATENT DOCUMENTS

| | | |
|---|---|---|
| CN | 204685543 | 10/2015 |
| CN | 105172754 | 12/2015 |
| CN | 105235647 | 1/2016 |
| CN | 106799367 | 6/2017 |
| CN | 206436913 | 8/2017 |
| CN | 107571807 | 1/2018 |
| CN | 206868696 | 1/2018 |
| DE | 10332939 | 2/2005 |
| DE | 102005007095 | 8/2006 |
| DE | 102005021671 | 11/2006 |
| DE | 102010007850 | 9/2010 |
| DE | 102014200097 | 7/2015 |
| DE | 112014002071 | 12/2015 |
| DE | 102014213282 | 1/2016 |
| DE | 102014017517 | 3/2016 |
| DE | 102015013203 | 3/2016 |
| DE | 102014220257 | 4/2016 |
| DE | 102016006039 | 11/2016 |
| DE | 112015001856 | 12/2016 |
| EP | 2845773 | 3/2015 |
| EP | 2930293 | 10/2015 |
| EP | 2949521 | 12/2015 |
| EP | 2955069 | 12/2015 |
| EP | 3141441 | 3/2017 |
| EP | 3169549 | 5/2017 |
| FR | 2875661 | 3/2006 |
| FR | 3027006 | 4/2016 |
| JP | 4202941 | 8/2005 |
| JP | 2006060425 | 3/2006 |
| JP | 2009220719 | 10/2009 |
| JP | 2012035654 | 2/2012 |
| JP | 5756349 | 1/2013 |
| JP | 6120395 | 1/2014 |
| JP | 2014201150 | 10/2014 |
| JP | 6213157 | 3/2015 |
| JP | 2015137070 | 7/2015 |
| JP | 3201779 | 12/2015 |
| JP | 2015216463 | 12/2015 |
| JP | 2016000599 | 1/2016 |
| JP | 2016009099 | 1/2016 |
| JP | 2016078688 | 5/2016 |
| JP | 2016088192 | 5/2016 |
| JP | 2016131957 | 7/2016 |
| JP | 2017105422 | 6/2017 |
| JP | 2017128188 | 7/2017 |
| JP | 2017129465 | 7/2017 |
| KR | 101704047 | 12/2012 |
| KR | 101534934 | 5/2015 |
| KR | 101813133 | 12/2017 |
| KR | 20170137359 | 12/2017 |
| WO | WO2017002877 | 1/2017 |
| WO | WO2017002878 | 1/2017 |
| WO | WO2017002879 | 1/2017 |
| WO | WO2017006818 | 1/2017 |
| WO | WO2017045832 | 3/2017 |
| WO | WO2017048126 | 3/2017 |
| WO | WO2017137277 | 8/2017 |
| WO | WO2017153476 | 9/2017 |
| WO | WO2017182224 | 10/2017 |
| WO | WO2017189219 | 11/2017 |
| WO | WO2017202562 | 11/2017 |
| WO | WO2017202625 | 11/2017 |
| WO | WO2017202691 | 11/2017 |
| WO | WO2017217161 | 12/2017 |
| WO | WO2017220584 | 12/2017 |

OTHER PUBLICATIONS

International Searching Authority, U.S. Patent Office, International Search Report and Written Opinion for International App. No. PCT/US2015/026204 dated Aug. 10, 2015.

International Searching Authority, U.S. Patent Office, International Search Report and Written Opinion for International App. No. PCT/US2012/028828 dated Jun. 22, 2012.

European Patent Office, European Search Report for EP App. No. 15 77 6160 dated Mar. 5, 2018.

* cited by examiner

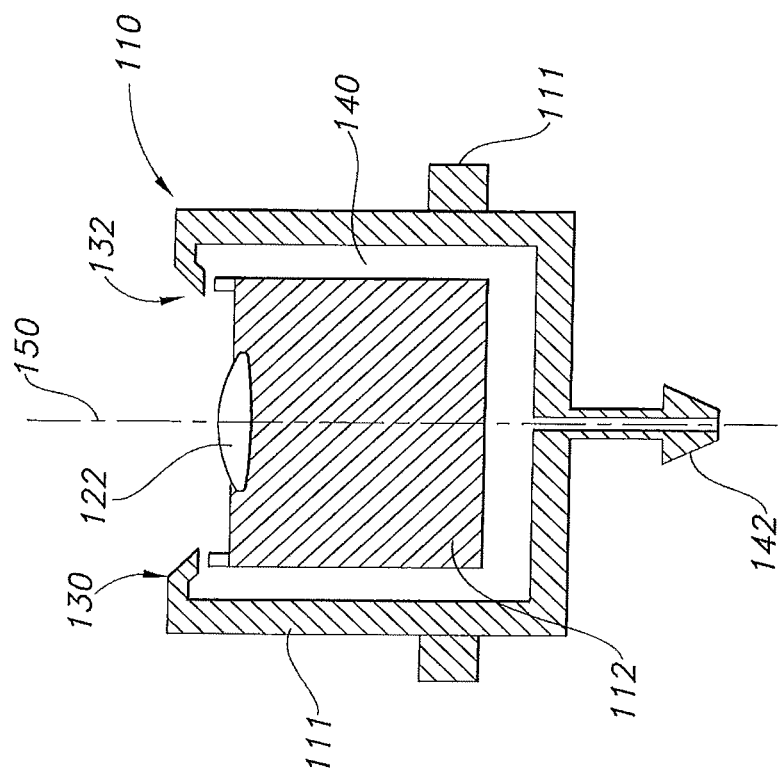

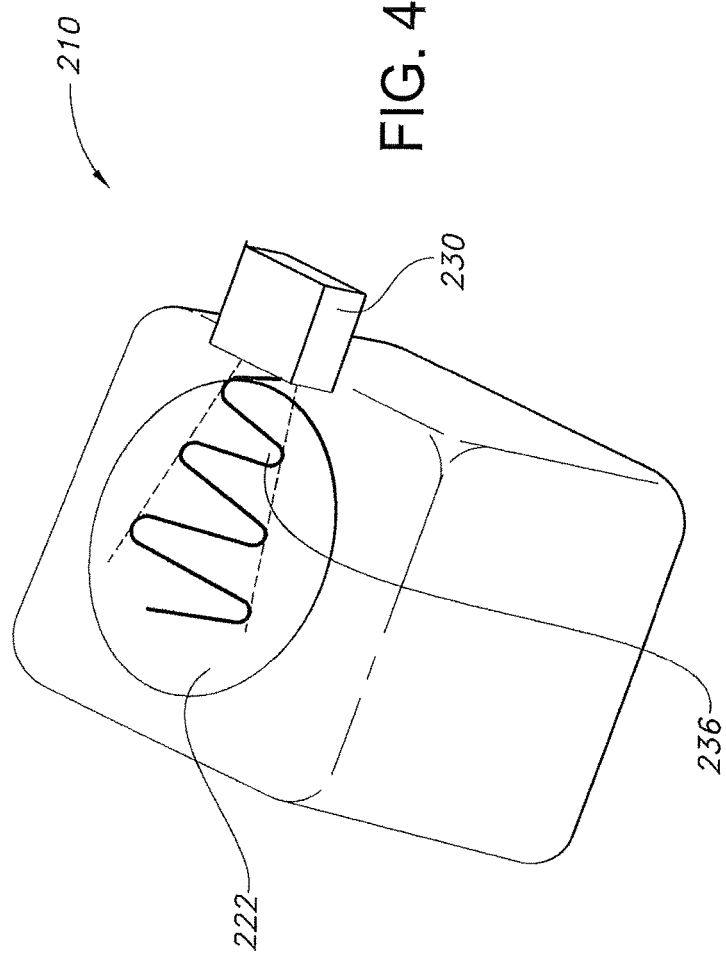

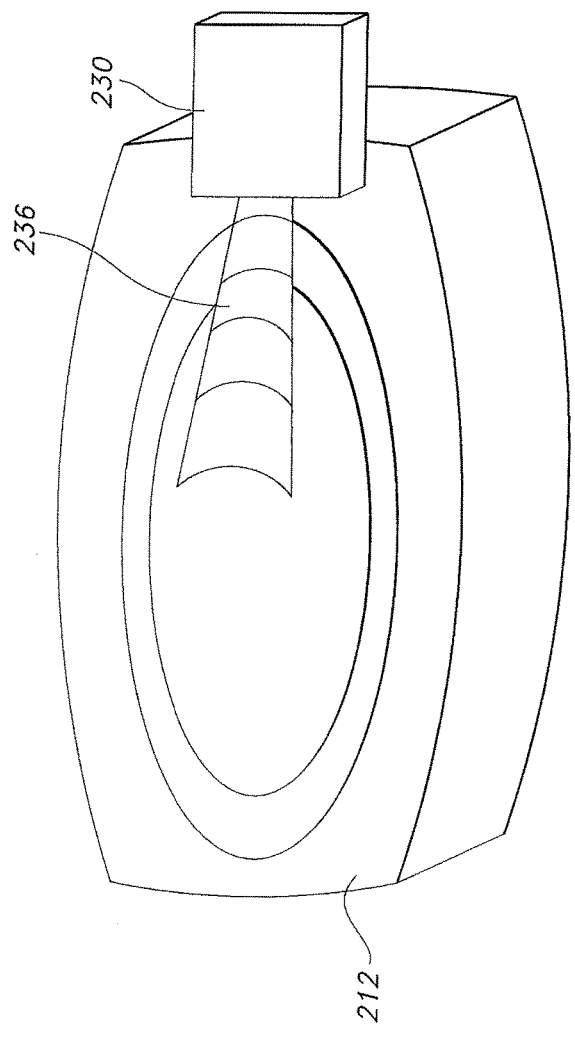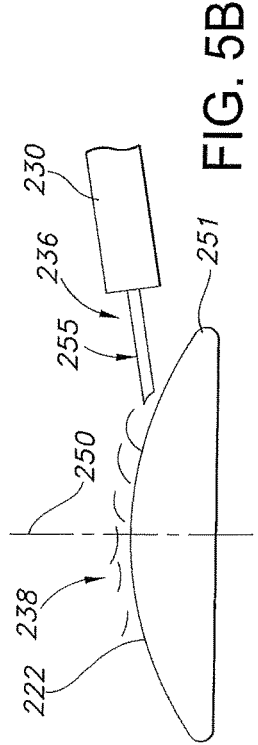
FIG. 5A
FIG. 5B

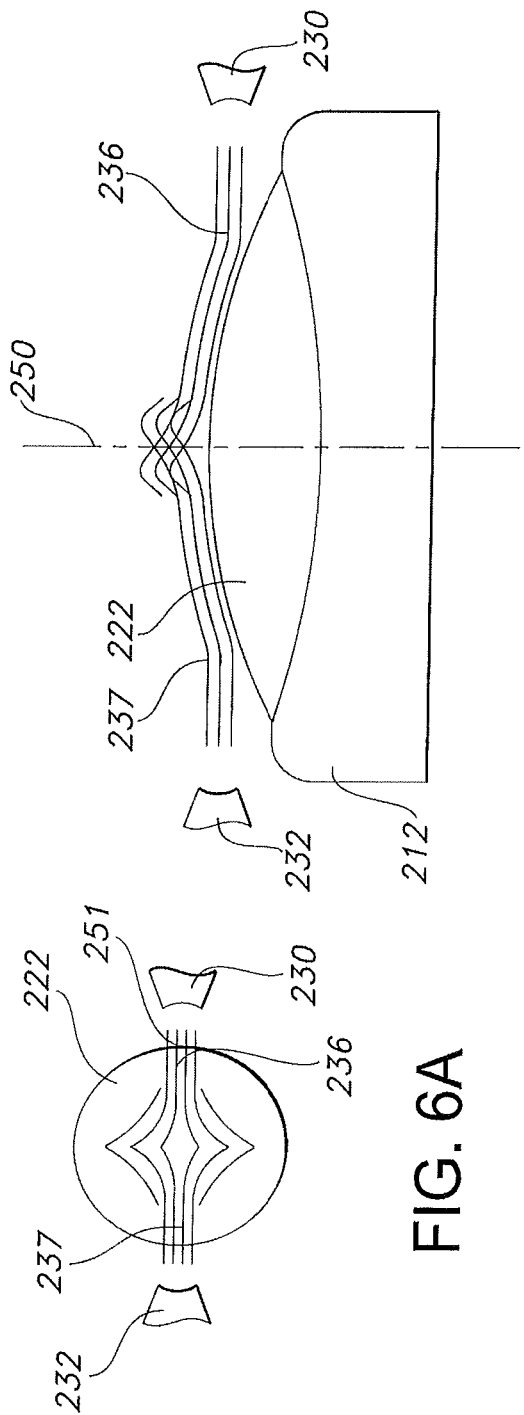

INTEGRATED AUTOMOTIVE SYSTEM, NOZZLE ASSEMBLY AND REMOTE CONTROL METHOD FOR CLEANING AN IMAGE SENSOR'S EXTERIOR OR OBJECTIVE LENS SURFACE

PRIORITY CLAIMS AND REFERENCE TO RELATED APPLICATIONS

This application claims priority to related to: (1) commonly owned U.S. provisional patent application No. 61/451,492, filed Mar. 10, 2011, and (2) commonly owned PCT application no. PCT/US12/28828, filed Mar. 10, 2012, and (3) commonly owned U.S. application Ser. No. 14/004,269, filed Sep. 10, 2013, the entire disclosures of which are expressly incorporated herein by reference. This application is a Divisional application for copending, U.S. patent application Ser. No. 14/004,269.

BACKGROUND OF THE INVENTION

Field of the Invention

The present invention relates to automated or remotely controlled methods and apparatus for cleaning soiled objective lenses on video cameras or image sensors when mounted in a configuration that is exposed to dirty environments.

Discussion of the Prior Art

External view (e.g., front bumper, side-view, rear-view or back-up) cameras have been added to recreational vehicles and automobiles to enhance the driver's vision and to improve safety. Increasingly, a wide range of cars and SUVs include integrated video cameras which generate an image for display to the driver, operator or other occupants or users within the vehicle's interior.

Drivers often find it difficult to move their vehicles from parked positions when they cannot see or know what is behind the vehicle. The recent introductions of front-bumper, side-view and rear-view cameras in cars and SUVs by vehicle manufacturers allow drivers to see whether obstacles surround their vehicle using a display screen mounted either on a rear view mirror or in a navigation system screen.

The external image sensors such as those known as back-up or rear view cameras are typically mounted unobtrusively, and incorporated into existing features such as the vehicle's rear name plate. These external cameras are exposed to the vehicle's harsh environmental surroundings and are often soiled by mud, salt spray or dirt which accumulates on the lens. Accumulating dirt and debris often distort the image drivers are viewing, thus creating confusion, dissatisfaction or a safety issue due to poor judgment by relying on an unclear picture.

The advent of low cost, reliable imaging devices using solid-state sensor technologies (e.g., CMOS pixel sensor technology), combined with an improved cost/performance ratio for video displays capable of meeting automotive specifications, and an increasing application rate of video monitor displays for automotive navigation systems and the like, has lead to an increasing use of cameras or imaging sensors designed to give the driver a view of those areas around the vehicle which are not in the normal direct field of view of the driver, typically referred to as "blind spots". These areas include the region close to the front of the vehicle, typically obscured by the forward structure of the vehicle, the region along the passenger side of the vehicle, the region along the driver's side of the vehicle rearward of the driver, and the area or region immediately rearward of the vehicle which cannot be seen directly or indirectly through the rear view mirror system. The camera or imaging sensor may capture an image of the rearward (or sideward or other blind spot area) field of view, and the image may be displayed to the driver of the vehicle to assist the driver in backing up or reversing or otherwise driving or maneuvering the vehicle.

The use of electronic cameras in vehicle imaging systems can significantly increase a diligent driver's knowledge of the space immediately surrounding the vehicle prior to and during low speed maneuvers, and thus contributes to the safe completion of such maneuvers. It is thus known to provide a camera or imaging sensor on a vehicle for providing an image of an exterior scene for the driver. Such a camera may be positioned within a protective housing, which may be closed about the camera or sensor and secured together via fasteners or screws or the like. For example, a metallic protective housing may be provided, such as a die cast housing of aluminum or zinc or the like. In particular, for camera sensors mounted on the exterior of a vehicle, protection against environmental effects, such as rain, snow, road splash and/or the like, and physical protection, such as against road debris, dirt, dust, and/or the like, is important. Thus, for example, in known exterior camera sensor mounts, a butyl seal, such as a hot dispensed butyl seal, or an O-ring or other sealing member or material or the like, has been provided between the parts of the housing to assist in sealing the housing to prevent water or other contaminants from entering the housing and damaging the camera or sensor positioned therein. However, such housings typically do not provide a substantially water tight seal, and water droplets thus may enter the housing. Furthermore, any excessive vibration of the camera sensor, due to its placement (such as at the exterior of the vehicle), may lead to an undesirable instability of the image displayed to the driver of the vehicle. Also, such cameras or sensors are costly to manufacture and to implement on the vehicles.

Such vehicle vision systems often position a camera or imaging sensor at an exterior portion of a vehicle to capture an image of an exterior scene. The cameras, particularly the cameras for rearward vision systems, are thus typically placed or mounted in a location that tends to get a high dirt buildup on the camera and/or lens of the camera, with no easy way of cleaning the camera and/or lens. In order to reduce the dirt or moisture buildup on the lenses of such cameras, prior art developers proposed using hydrophilic or hydrophobic coatings on the lenses. However, the use of such a hydrophilic or hydrophobic coating on the lens is not typically effective due to the lack of air flow across the lens, especially within a sealed housing. It has also been proposed to use heating devices or elements to reduce moisture on the lenses, within the sealed housing. However, the use of a heated lens in such applications, while reducing condensation and misting on the lens, may promote the forming of a film on the lens due to contamination that may be present in the moisture or water. Also, the appearance of such cameras on the rearward portion of vehicles is often a problem for styling of the vehicle. See, for example, prior art U.S. Pat. No. 7,965,336 to Bingle, et al. which discloses a camera module with a plastic housing that houses an image sensor, which is operable to capture images of a scene occurring exteriorly of the vehicle. Bingle's camera housing assembly is welded together with the image sensor and associated components within enclosed the plastic housing, and includes a "breathable" ventilation portion that is at least partially permeable to water vapor to allow emission of internal water vapor substantially precluding passage of water droplets and other contaminants, and so Bingle's design seeks to minimize problems arising from fluid impacting or accumulating within the housing.

Bingle also seeks to use coated lenses to keep the objective lenses' view clear, and Bingle's housing or cover 22 is optionally be coated with an anti-wetting property such as via a hydrophobic coating (or stack of coatings), such as is disclosed in U.S. Pat. No. 5,724,187. Bingle notes that a hydrophobic property on the outermost surface of the cover can be achieved by a variety of means, such as by use of organic and inorganic coatings or by utilizing diamond-like carbon coatings. But Bingle and others do not propose actually taking any affirmative action to remove road debris (e.g., accumulated dirt, dust, mud, road salt or other built-up debris) apart from using such coatings or surface treatments.

Based on consumer preference and at least a perceived improved ability to extract information from the image, it is desired to present an image to the driver that is representative of the exterior scene as perceived by normal human vision. It is also desirable that a vehicle's imaging devices or systems be useful in all conditions, and particularly in all weather and lighting conditions. However, it is often difficult to provide an imaging sensor which is capable of providing a clear image in poor weather, especially while driving. This is because conventional imaging systems typically have difficulty resolving scene information when the camera's objective lens is partially obstructed by accumulated debris (e.g., accumulated dirt, dust, mud, road salt or other built-up debris).

In order to have effective use of the camera-based visibility systems in all weather conditions, it is desirable to have an effective method of keeping the camera lens (or the housing surface protecting the objective lens) clean, but the potentially deleterious effects of moisture noted in Bingle remain. When driving or operating a vehicle during bad weather, drivers are especially reluctant to exit the vehicle to find and inspect the camera's lens.

This reluctance likely explains why the inventors of U.S. Pat. No. 6,834,904 (to Vaitus et al) included a "Nozzle" 92 "in close proximity to" lens 84 for the vehicle's camera or vision unit 71. The Vaitus '904 patent generally discloses the structure and method for mounting a "Vehicle Liftgate with Component Module Applique" wherein applique module 50 is adapted for attachment to vehicle liftgate 20 and, as shown in Vaitus' FIG. 2, module 50 includes a nozzle 92 which receives fluid from conduit 94, but, as noted in the description at Col 5, lines 5-25, "cleaning of lens 84 may be implemented in other ways" such as hydrophobic lens coatings. It appears that the module and nozzle arrangement described so indifferently in the Vaitus '904 patent was not deemed to be a practicable or effective solution meriting further development, and so appears to have been ignored.

There is a need, therefore, for a convenient, effective and unobtrusive system and method for cleaning an exterior objective lens surface, and preferably by remote control.

OBJECTS AND SUMMARY OF THE INVENTION

Accordingly, it is an object of the present invention to overcome the above mentioned difficulties by providing a convenient, effective and unobtrusive system and method for cleaning an exterior objective lens surface to remove accumulated debris (e.g., accumulated dirt, dust, mud, road salt or other built-up debris).

In accordance with the present invention, an external lens washing system has an aiming fixture configured to support and constrain an external lens which is exposed to the elements and apt to become soiled with debris. A nozzle assembly is configured to be supported and aimed toward the external lens by the aiming fixture and has at least one laterally offset washing nozzle projecting from the aiming fixture to a spray washing fluid toward the external lens surface, spraying at a shallow, glancing spray aiming angle to impinge upon and wash the lens external surface.

Optionally, an integrated image sensor and lens washing assembly is configured for use with a remote control method for cleaning an exterior objective lens surface and includes a sealed image sensor housing assembly including an integral, remotely controllable lens cleaning system with an optimized configuration for aiming one or more cleansing sprays from one or more laterally offset fluidic oscillators.

The integrated automotive system uses one or more aimed sprays to clean an exterior objective lens surface and the method enables the driver to determine when to clean a soiled external-view camera's objective lens, so the driver can ensure that the lens is adequately cleaned of accumulated debris (e.g., accumulated dirt, dust, mud, road salt or other built-up debris) before moving.

The system of the present invention provides an image sensor housing assembly including an integral, remotely controllable lens cleaning system with an optimized configuration for aiming one or more cleaning sprays of selected fluidic oscillators at the housing's transparent objective lens protective cover to safely and quickly remove accumulated debris (e.g., accumulated dirt, dust, mud, road salt or other built-up debris) and minimize the likelihood that vision obstructing debris or washer fluid droplets remain in the camera's field of view.

In a preferred embodiment of the lens cleaning system of the present invention, low flow rate fluidic circuit nozzles are configured and aimed in a manner which uses very little washing fluid. As a result, integrating the system of the present invention in a vehicle uses less washing fluid from the vehicle's washer fluid bottle and provides bottle-cleanings savings, conservation of fluid, and conservation of pressure. Conservation of washer fluid pressure is especially important when the camera lens cleaning system is integrated into an existing vehicle design's front wash system, where the camera lens washing system must function without detrimentally affecting front glass cleaning, especially under dynamic driving conditions, where the front glass cleaning system's performance is highly sensitive to fluid pressure. The system and method of the present invention is not limited to use with low flow rate nozzles exclusively, however. Applicants have prototyped a relatively high flow rate nozzle assembly on an exemplary system and it works well, although the camera's image is somewhat compromised when actually spraying fluid and washing. It appears that the low flow rate is best accomplished thru a selected fluidic circuit geometry which allows washing fluid, since droplet size should remain larger when compared to a shear nozzle.

Applicants' prototype development work has revealed that a certain lens washing nozzle configuration and aiming orientation presents a surprisingly effective and evenly distributed oscillating spray pattern with the following benefits:

Allows for nearly flush mounting to the camera's distal or objective lens surface, which means the camera-plus-washer package or assembly does not get longer and interfere, or interfere as much, with camera viewing angles as a directed impact nozzle configuration would; and can be packaged in really close to keep the overall width of the camera-plus-washer package from growing wider and larger; (e.g., a wider or larger diameter bug-eye lens would likely need to have the nozzle spray originate above the lens, angled down, and pushed away from the center line to avoid sight lines, although this would result in a wider and longer package).

The applicants have discovered that directly spraying at a narrow, glancing angle nearly parallel to the objective lens assembly's external surface results in less washer fluid or water remaining on the lens after conclusion of spraying and prevents water droplets from forming and remaining on the lens and obstructing the view after washing. In prototype development experiments, a more nearly on-lens axis or direct impingement spray method was discovered to leave view-obstructing droplets behind. In other prototype development work, applicants have also noted that shear nozzles work surprisingly well.

Broadly speaking, the integrated automotive system and nozzle assembly of the present invention is configured for use with a remote control method for cleaning an exterior objective lens surface includes a sealed image sensor housing assembly including an integral, remotely controllable lens cleaning system with an optimized configuration for aiming one or more cleansing sprays from selected fluidic oscillators at the housing's transparent objective lens protective cover.

In use, a driver, user or operator views the image generated by the external camera or image sensor on an interior video display and decides whether and when to clean the external camera's objective lens cover's surface to remove accumulated debris (e.g., accumulated dirt, dust, mud, road salt or other built-up debris). An interior remote actuation control input (e.g., button or momentary contact switch) is provided within the operator's easy reach for convenient use in cleaning the lens, and the operator actuates the system and causes the cleansing spray to begin while viewing the image sensor's output on the video display, stopping actuation of the system when the operator deems the image sensor's view to be satisfactory.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

BRIEF DESCRIPTION OF THE DRAWINGS

FIG. 2 is a schematic diagram illustrating an automotive imaging system with a camera housing and integrated nozzle assembly configured for use with a remote control method for cleaning the imaging system's exterior objective lens surface, in accordance with the present invention.

FIG. 4 is a schematic diagram illustrating a fluidic spray from an embodiment of the camera housing and integrated nozzle assembly of FIG. 3, in accordance with the present invention.

FIGS. 5A and 5B are schematic diagrams illustrating a perspective view and a side view of a fluid sheet sprayed by an aimed nozzle assembly configured for use with the method for cleaning an imaging system's exterior objective lens surface, in accordance with the present invention.

FIGS. 6A and 6B are schematic diagrams illustrating a top or plan view and a side view of an embodiment with opposing aimed washer fluid jets spreading fluid over a convex objective lens surface when sprayed by an washing system configured in accordance with the present invention.

DESCRIPTION OF THE PREFERRED EMBODIMENT

Vehicle Imaging System and Camera Module Nomenclature

In order to provide an exemplary context and basic nomenclature, we refer initially to FIGS. 1A-1D, illustrating a prior art imaging system for a vehicle and a camera module as disclosed in U.S. Pat. No. 7,965,336 (to Bingle et al). This overview will be useful for establishing nomenclature and automotive industry standard terminology, in accordance with the Prior Art.

Figure 1A:
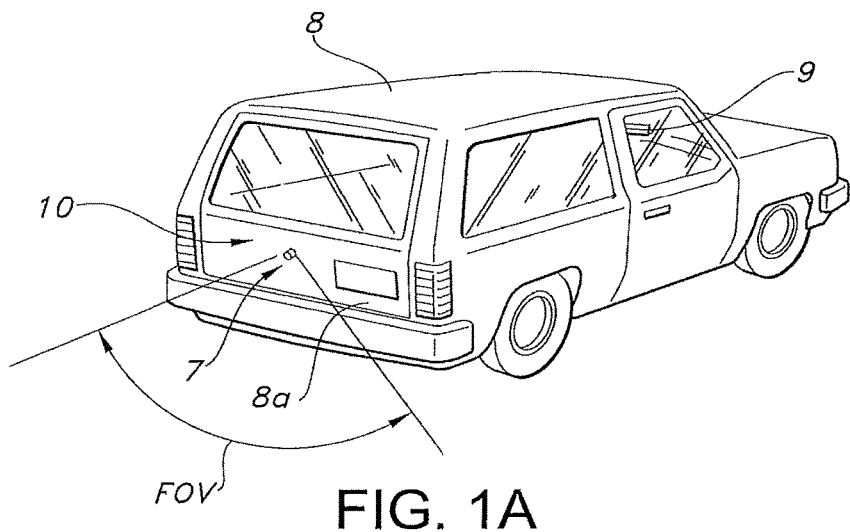
FIG. 1A, is a rear perspective view of a vehicle having an imaging system or back-up camera system as disclosed in U.S. Pat. No. 7,965,336 (to Bingle et al), in accordance with the Prior Art.
Figure 1B:
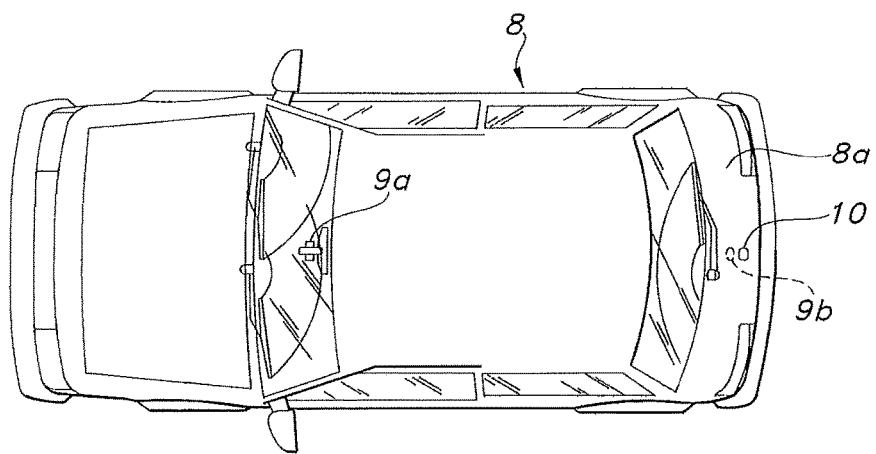
FIG. 1B is a plan view of the vehicle of FIG. 1A.

Referring now to FIGS. 1A-1D, an image capture system or imaging or vision system 7 is positioned at a vehicle 8, such as at a rearward exterior portion 8a of the vehicle 8, and is operable to capture an image of a scene occurring interiorly or exteriorly of the vehicle, such as rearwardly of the vehicle, and to display the image at a display or display system 9a of the vehicle which is viewable by a driver or occupant of the vehicle (see, e.g., FIGS. 1A and 1B). Imaging system 7 includes a camera module 10, which is mountable on, at or in the vehicle to receive an image of a scene occurring exteriorly or interiorly of the vehicle, and a control 9b that is operable to process images captured by an image sensor 18 of camera module 10. Camera module 10 includes a plastic camera housing 11 and a metallic protective shield or casing 16 (see FIGS. 1C & 1D).

Camera housing 11 includes a camera housing portion 12 and a connector portion 14, which mate or join together and are preferably laser welded or sonic welded together to substantially seal the housing 11 to substantially limit or prevent water intrusion or other contaminants from entering the housing, as discussed below.

Housing 11 of camera module 10 substantially encases a camera or image sensor or sensing device 18 (FIGS. 1C and 1D), which is operable to capture an image of the scene occurring exteriorly or interiorly of the vehicle, depending on the particular application of camera module 10. Housing 11 also includes a cover portion 20 at an end of camera housing portion 12. Cover portion 20 provides a transparent cover plate 22 which allows the image of the scene exteriorly or interiorly of the vehicle to pass therethrough and into housing 11 to camera image sensor 18. Camera module 10 may include the protective shield 16, which substantially encases camera housing portion 12 and a portion of connector portion 14, thereby substantially limiting or reducing electronic noise going into or out of the camera module and/or protecting the plastic housing 11 from damage due to impact or the like with various items or debris that may be encountered at the exterior of the vehicle.

Camera module 10 provides a camera image sensor or image capture device 18 for capturing an image of a scene occurring exteriorly or interiorly of a vehicle. The captured image may be communicated to a display or display system 9a which is operable to display the image to a driver of the vehicle. The camera or imaging sensor 18 useful with the present invention may comprise an imaging array sensor, such as a CMOS sensor or a CCD sensor or the like, such as disclosed in U.S. Pat. Nos. 5,550,677; 5,670,935; 5,796,094; 6,097,023, and 7,339,149. Camera module 10 and imaging sensor 18 may be implemented and operated in connection with various vehicular vision systems, and/or may be operable utilizing the principles of such other vehicular systems, such as a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; and 6,201,642, and/or a trailer hitching aid or tow check system, such as the type disclosed in U.S. Pat. No. 7,005,974, a reverse or sideward imaging system, such as for a lane change assistance system or lane departure warning system, such as the type disclosed in U.S. Pat. No. 7,038,577, a system for determining a distance to a leading or trailing vehicle or object, such as a system utilizing the principles disclosed in U.S. Pat. No. 6,396,397 or the like.

For example, the camera or sensor may comprise a LM9618 Monochrome CMOS Image Sensor or a LM9628 Color CMOS Image Sensor, both of which are commercially available from National Semiconductor. Other suitable cameras or sensors from other vendors (e.g., Sony®, Panasonic®, Magna™ and others) may be implemented with the camera module.

Although shown at a rear portion 8a of vehicle 8, camera 18 and camera module 10 may be positioned at any suitable location on vehicle 8, such as within a rear panel or portion of the vehicle, a side panel or portion of the vehicle, a license plate mounting area of the vehicle, an exterior mirror assembly of the vehicle, an interior rearview mirror assembly of the vehicle or any other location where the camera may be positioned and oriented to provide the desired view of the scene occurring exteriorly or interiorly of the vehicle. The camera module 10 is particularly suited for use as an exterior camera module. The image captured by the camera may be displayed at a display screen or the like positioned within the cabin of the vehicle, such as at an interior rearview mirror assembly (such as disclosed in U.S. Pat. No. 6,690,268), or elsewhere at or within the vehicle cabin, such as by using the principles disclosed in U.S. Pat. Nos. 5,550,677; 5,670,935; 5,796,094; 6,097,023 and 6,201,642, and/or U.S. Pat. No. 6,717,610.

Figure 1C:
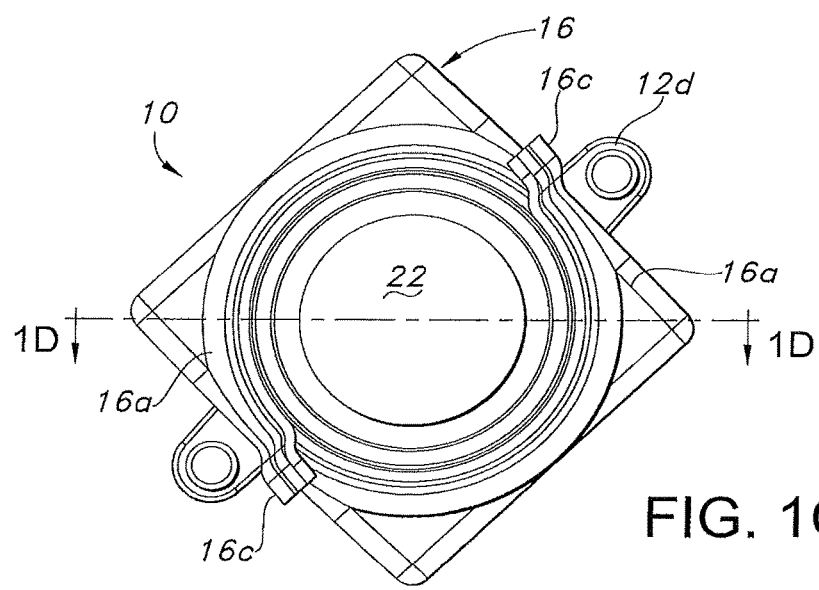
FIG. 1C is an end elevation of a sealed solid-state image sensor or camera module as disclosed in U.S. Pat. No. 7,965,336, in accordance with the Prior Art.
Figure 1D:
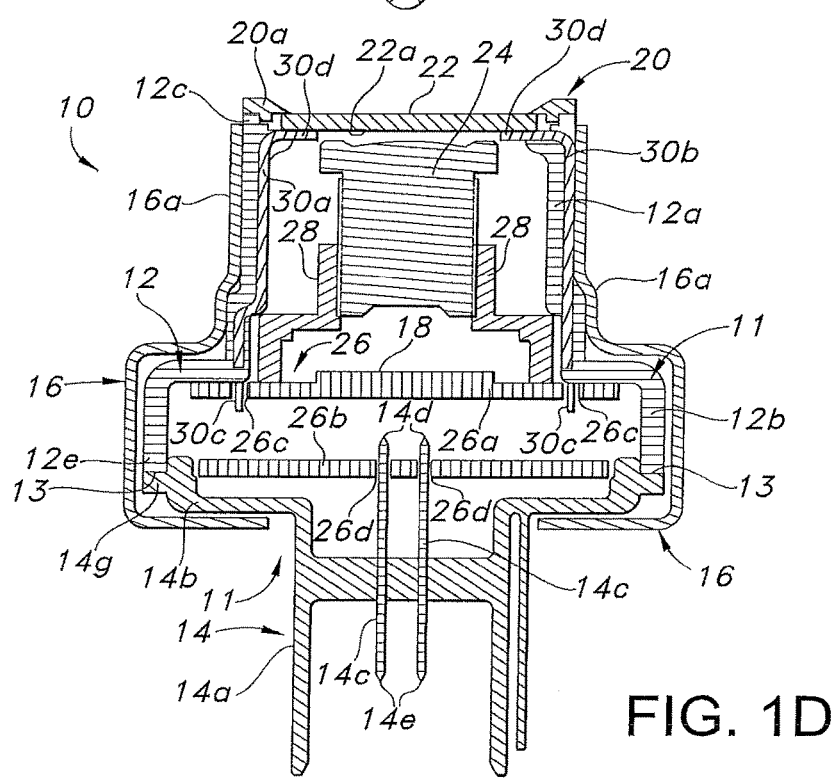
FIG. 1D is a sectional view of the camera module of FIG. 1C, taken along the line D-D.

As best shown in FIGS. 1C and 1D, camera housing portion 12 includes a generally cylindrical portion 12a extending outwardly from a base portion 12b. Camera housing portion 12 comprises a molded plastic component and may include a pair of heater terminals or elements 30a, 30b insert molded within and/or along the walls of cylindrical portion 12a. Cylindrical portion 12a receives a lens or optic system 24 therein, which functions to focus the image onto camera or sensor 18, which is positioned at a circuit board 26 mounted within the base portion 12b of camera housing portion 12.

Lens system 24 is positioned within cylindrical portion 12a of camera portion 12 to receive light from the exterior or interior scene through cover 22 at end 12c of camera portion 12. Lens system 24 is mounted to, such as via threaded engagement with, camera cover or housing 28, which functions to substantially cover or encase camera or sensor 18 to substantially prevent or limit incident light from being received by camera 18 and interfering with the image received by camera 18 through cover 22 and lens system 24. The lens system 24 may be any small lens or lens system which may focus an image of the scene exteriorly of the camera module onto the camera or image sensor 18, such as, for example, the types disclosed in U.S. Pat. No. 6,201,642 or U.S. Pat. No. 6,757,109. The lens system 24 may provide a wide-angle field of view, such as approximately 120 degrees or more (as shown in FIG. 1A).

Cover portion 20 is mounted at an outer end 12c of camera housing portion 12 opposite from base portion 12b, as shown in FIGS. 1C and 1D. Cover portion 20 includes an outer circumferential ring or cover retainer 20a, which engages an outer surface of transparent cover 22 and functions to retain transparent cover 22 in position at the end 12c of the cylindrical portion 12a of camera receiving portion 12. Preferably, circumferential ring 20a is laser welded or sonic welded or otherwise joined or bonded to outer end 12c of cylindrical portion 12a of camera receiving portion 12 to substantially seal and secures cover portion 20 onto camera receiving portion 12, and may limit or substantially preclude any water intrusion or contaminant intrusion into the camera receiving portion at the outer end 12c.

In the illustrated embodiment, base portion 12b is generally square and defines a generally square mating edge 12e around the base portion 12b for mating and securing to a corresponding edge 14g of connector portion 14 at joint 13. Base portion 12b receives circuit board 26 and camera 18 therein, while a camera housing or shield 28 and lens or lens system 24 extend into cylindrical portion 12a of camera portion 12 to receive the image through transparent cover 22.

Connector portion 14 of housing 11 is a molded plastic component and includes a connector terminal or connector 14a, such as a multi-pin snap-on connector or the like, extending from a base portion 14b. Base portion 14b is formed (such as in a square shape as shown in the illustrated embodiment) to substantially and uniformly mate or connect to base portion 12b of camera housing 12, as can be seen with reference to FIGS. 1C and 1D. The base portions 12b and 14b mate together and define a pocket or space for receiving and securing circuit board 26 therein. Base portions 14b and 12b may be laser welded or sonic welded together at their mating joint or connection 13. Laser or sonic welding of the joint melts the plastic edges or seams together to substantially hermetically seal housing 11 to prevent water intrusion or other contaminant intrusion into housing 11 of camera module 10. Optionally, and less desirably, the base portions may be otherwise joined or substantially sealed together (such as via suitable adhesives and/or sealants). The module may optionally include a vented portion or semi-permeable membrane to vent the module's interior. The base portions 12b and 14b may further include mounting tabs or flanges 12d, which extend outwardly from base portion 12b. Mounting tabs 12d are generally aligned with one another when the base portions are secured together and include an aperture therethrough for mounting the camera module 10 at or to the vehicle 8 via suitable fasteners or the like (not shown). Although shown as having generally square-shaped mating portions, connector portion 14 and camera portion 12 may have other shaped mating portions or surfaces.

Multi-pin connector 14a extends from base portion 14b and includes a plurality of pins or terminals 14c for electrically connecting camera module 10 with a connector (not shown) connected with the wiring harness or cables of the vehicle. For example, one end 14d of terminals 14c may connect to circuit board 26, while the other end 14e of terminals 14c connects to the corresponding connector of the vehicle. The corresponding connector may partially receive the ends 14e of pins or terminals 14c at multi-pin connector 14a and may snap together with multi-pin connector 14a via a snap connection or the like. As best shown in FIG. 1D, ends 14d of terminals 14c protrude or extend from connector portion 14, such that the ends 14d may be received within corresponding openings or apertures 26c in circuit board 26 when housing portion 11 is assembled.

As shown in FIG. 1D, connector portion 14 may provide a generally straight multi-pin connector extending longitudinally from the base portion of the housing 11. However, other shapes of connectors, such as angled connectors or bent connectors or the like, may be implemented, depending on the particular application of the camera module.

Optionally, camera module 10 may comprise a substantially hermetically sealed module, such that water intrusion into the module is limited or substantially precluded. Base portion 12b of camera housing portion 12 and base portion 14b of connector portion 14 are correspondingly formed so as to substantially mate or join together at their mating seam 13, whereby the portions may be laser welded or sonic welded together or otherwise joined, while cover portion 20 is also laser welded or sonic welded or otherwise secured and substantially sealed at the opposite end 12c of camera portion 12, in order to substantially seal the camera housing. Laser or sonic welding techniques are preferred so as to join the materials at a state where they are able to re-flow, either via heat, vibration or other means, such that the materials re-flow and cross-link and become a unitary part. Such joining results in a substantially hermetically sealed camera module. Additionally, the pores in the plastic as well as any voids around the insert molded pins and stampings may be sealed with a Loctite® brand sealing material or other suitable sealing material, to further limit or substantially preclude entry of water droplets and/or water vapor into the housing of the substantially sealed camera module 10.

Circuit board 26 includes a camera mounting circuit board 26a, which is connected to a connector receiving circuit board 26b via a multi-wire ribbon wire or the like (not shown). Camera mounting circuit board 26a is mounted or secured to the base portion 12b of camera portion 12, while connector circuit board 26b is mounted or secured to the base portion 14b of connector portion 14. Camera or image sensor 18 is mounted at a surface of camera circuit board 26a, and is substantially encased at circuit board 26a by camera cover 28 and lens 24 (FIGS. 1C and 1D). Camera circuit board 26a includes a pair of apertures 26c for receiving ends 30c of terminals 30a, 30b. Likewise, connector circuit board 26b includes a plurality of openings or apertures 26d for receiving ends 14d of connector terminals 14c therethrough. The ends of the pins or terminals may be soldered in place in their respective openings. After all of the connections are made, the housing may be folded to its closed position and laser welded or sonic welded together or otherwise joined or bonded together to substantially seal the circuit board within the housing.

Optionally, the exterior surface of cover 22 (which may be exposed to the atmosphere exterior of the camera module) may be coated with an anti-wetting property such as via a hydrophilic coating (or stack of coatings), such as is disclosed in U.S. Pat. Nos. 6,193,378; 5,854,708; 6,071,606; and 6,013,372. Also, or otherwise, the exterior or outermost surface of cover 22 may optionally be coated with an anti-wetting property such as via a hydrophobic coating (or stack of coatings), such as is disclosed in U.S. Pat. No. 5,724,187. Such hydrophobic property on the outermost surface of the cover can be achieved by a variety of means, such as by use of organic and inorganic coatings utilizing a silicone moeity (for example, a urethane incorporating silicone moeities) or by utilizing diamond-like carbon coatings. For example, long-term stable water-repellent and oil-repellent ultra-hydrophobic coatings, such as described in WIPO PCT publication Nos. WO0192179 and WO0162682, can be disposed on the exterior surface of the cover. Such ultra-hydrophobic layers comprise a nano structured surface covered with a hydrophobic agent which is supplied by an underlying replenishment layer (such as is described in Classen et al., "Towards a True 'Non-Clean' Property: Highly Durable Ultra-Hydrophobic Coating for Optical Applications", ECC 2002 "Smart Coatings" Proceedings, 2002, 181-190). For enablement and completeness of disclosure, all of the foregoing references are incorporated herein by reference.

In FIGS. 1A-1D, camera module 10 is shown to include a protective conductive shield or casing 16 which partially encases the plastic housing 11 and functions to limit or reduce electronic noise which may enter or exit camera module 10 and may protect the plastic housing from damage from impact of various items or debris which the camera module may encounter at the exterior portion of the vehicle. The protective shield or casing 16 includes a pair of casing portions 16a (one of which is shown in FIGS. 1C and 1D). Each of the casing portions 16a partially encases about half of the plastic housing 11 of camera module 10 and partially overlaps the other of the casing portion 16a, to substantially encase the plastic housing within protective shield 16. Each of the portions 16a includes a slot 16b for receiving the mounting tabs 12d therethrough for mounting the camera module at the desired location at the vehicle. Each casing portion 16a includes overlapping portions 16c which overlap an edge of the other casing portion 16a to assemble the casing 16 around the plastic housing 11. The casing portions 16a may be welded, crimped, adhered, banded, or otherwise joined or secured together about the plastic housing 11, in order to encase the housing 11. Preferably, protective shield 16 comprises a metallic shield and contacts ground terminal 30b of heating device 30 at the exterior surface of the cylindrical portion 12a of camera receiving portion 12 and, thus, may be grounded to the heating device and/or the camera module or unit via the ground terminal 30b. Protective shield 16 may comprise a stamped metal shielding or may be formed by vacuum metalizing a shield layer over the plastic housing 11, or may comprise a foil or the like.

Camera Housing and Integrated Washing System Nozzle Assembly.

Referring now to FIGS. 2-13D, an exemplary embodiment of the present invention has an integrated camera housing and washing system nozzle assembly 110 and FIGS. 2-13D illustrate the method for cleaning a camera's or image sensor's exterior objective lens surface (e.g., 122), in accordance with the present invention. Integrated camera housing and nozzle assembly 110 preferably includes one or more laterally offset nozzles 130, 132 configured and aimed to generate an oscillating spray to clean exterior objective lens surface 122, and allows a vehicle's driver, user or operator to use interior display 9a to determine whether external-view camera objective lens surface or cover 122 is occluded by or covered with accumulated debris (e.g., accumulated dirt, dust, mud, road salt or other built-up debris, not shown). The driver will want to ensure that the external objective lens surface 122 is adequately cleaned before moving the vehicle 8. Laterally offset nozzles 130, 132 are preferably entirely out of the image sensor's distal field of view and are configured and aimed to spray washing fluid onto external objective lens surface 122 at a narrow, glancing angle which is preferably nearly parallel to the objective lens assembly's external surface 122, as will be described in more detail below.

Camera housing and nozzle assembly 110, as illustrated in FIG. 2 has an external housing 111 with a hollow interior enclosed within fluid-impermeable sidewalls and a substantially fluid impermeable sealed camera module 112 is carried within the interior of housing 111 which defines an enclosure with an interior lumen or fluid path 140 preferably configured to define least one fluidic oscillator that operates on a selectively actuated flow of pressurized fluid flowing through the oscillator's interior 140 to generate an exhaust flow in the form of an oscillating spray of fluid droplets (not shown), as will be described below. The oscillator in fluid path 140 comprises a proximal inlet 142 for pressurized washer fluid, an interaction chamber defined within the housing fluid path 140 receives the pressurized washer fluid from inlet 142 and passes the pressurized fluid distally to outlets or nozzles 130, 132 so an oscillating washer fluid spray exhausts from the interaction chamber 140. Fluidic oscillators can provide a wide range of liquid spray patterns by cyclically deflecting a fluid jet. The operation of most fluidic oscillators is characterized by the cyclic deflection of a fluid jet without the use of mechanical moving parts. Consequently, an advantage of fluidic oscillators is that they provide an oscillating spray of fluid droplets but don't require moving parts and so are not subject to the wear and tear which adversely affects the reliability and operation of other oscillating spray devices. Alternatively, camera housing and nozzle assembly 110 may have a featureless hollow interior lumen defining a cylindrical or annular fluid path from proximal fluid inlet 142 to an open distal shear nozzle adapted to spray external objective lens surface 122 with washer fluid at a narrow, glancing angle nearly parallel to the objective lens assembly's external surface 122.

Figure 12A:
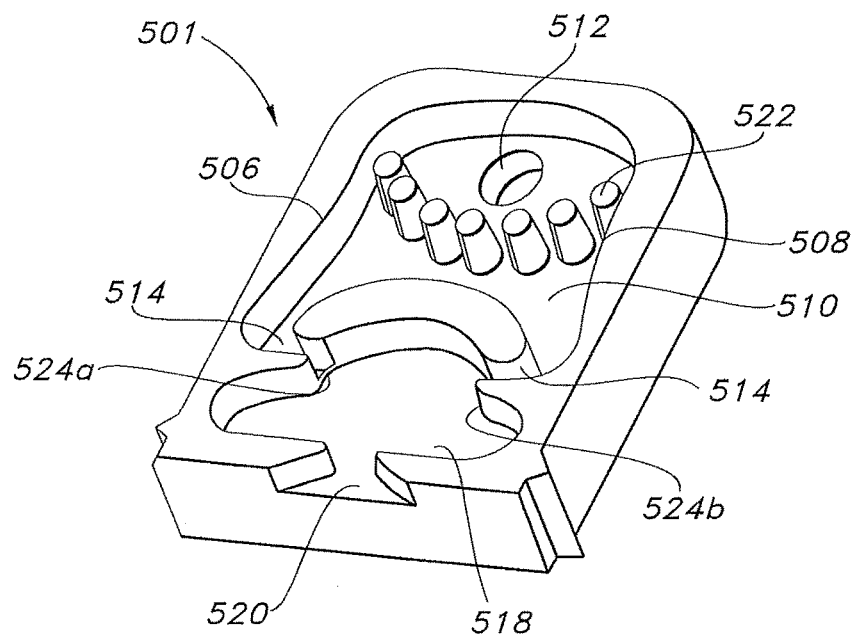
FIGS. 12A and 12B illustrate the fluidic circuit features of an exemplary stepped mushroom fluid oscillator for use with an external camera lens cleaning nozzle assembly of the present invention.
Figure 12B:
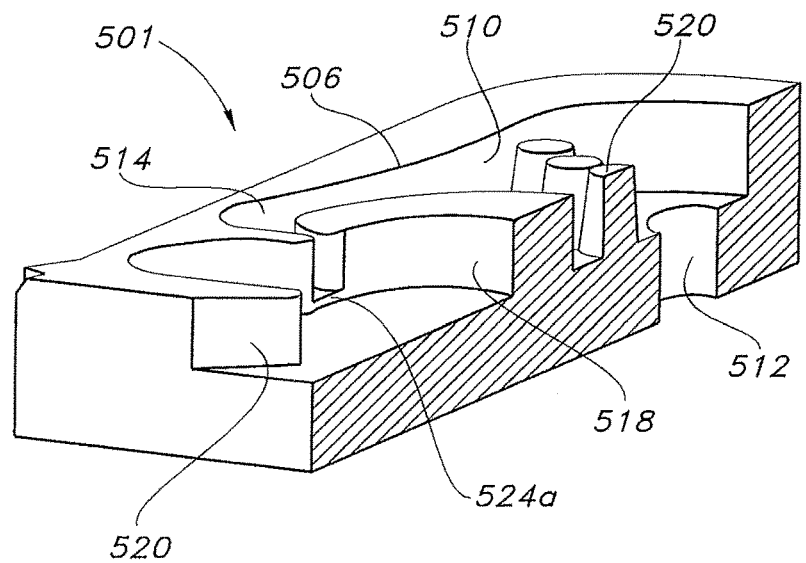

Camera housing and nozzle assembly 110 preferably includes at least one "stepped mushroom" fluidic oscillator of the type described in commonly owned U.S. Pat. No. 7,267,290 (Gopalan et al), the entire disclosure of which is incorporated herein by reference. As shown in FIGS. 12A and 12B (and described more fully in the incorporated '290 patent's description) the stepped mushroom fluidic oscillator is defined by inwardly projecting features (not shown in FIG. 2) acting on the fluid flowing distally in fluid path 140 which defines the interaction chamber within the housing fluid path 140. Washing fluid passes from proximal fluid inlet 142 distally into the interaction chamber 140 and the pressurized oscillating fluid jets pass to outlets or nozzles 130, 132 from which an oscillating washer fluid spray projects laterally onto objective lens surface 122. The preferred spray flow rate is approximately 200 ml/min per nozzle at 18 psi, and the spray thickness (i.e., which is seen in the plane transverse to the spray's fan angle plane as shown in FIG. 5B) is approximately 2 degrees.

As illustrated in FIG. 2, external lens washing system with housing and nozzle assembly 110 provides a substantially rigid aiming fixture (i.e., housing 111) having a distal side and a proximal side and being configured to support and constrain external lens 122 which is exposed toward the distal side. External lens 122 has an external lens surface with a lens perimeter and a lens central axis 150 projecting distally from the lens surface, wherein a lens field of view is defined as a distally projecting solid angle (e.g., a truncated cone or pyramid, not shown) including the lens central axis 150 and originating within the lens perimeter. The washing system includes at least a first nozzle assembly 110 which is configured to be supported and aimed toward external lens 122 by the aiming fixture defined by housing 111, and the first nozzle assembly includes a barbed fitting for fluid inlet 142 which is in fluid communication with a first laterally offset washing nozzle 132 which projects from the aiming fixture's distal side. The first nozzle assembly 110 is configured and aimed to spray washing fluid toward the external lens surface and across the field of view, spraying at a first selected spray aiming angle (e.g., between 1° and 20°) relative to the plane of the lens external surface. The first nozzle assembly is oriented to spray from a selected side, meaning that it is aimed to spray along a first selected spray azimuth angle in relation to a selected fixed reference point or datum on the lens perimeter.

Optionally, the first laterally offset washing nozzle 130 is configured as a non-oscillating shear nozzle configured to generate a substantially flat fan spray having a selected spray fan angle (e.g., 45° or another angled selected in the range of 15° to 120°). Alternatively, first laterally offset washing nozzle 130 may be configured as a non-oscillating bug-eye nozzle configured to generate at least one substantially solid fluid jet (i.e., a substantially solid fluid stream having no fan angle).

Preferably, the first laterally offset washing nozzle 130 is configured to aim the laterally offset washing nozzle from a first selected lateral offset distance from the center of the objective lens' external surface (e.g., the first selected lateral offset distance is preferably within the range bounded by 10 mm and 30 mm) for a spray having a fan angle in the range of 15° to 120°.

Turning now to FIGS. 3A-3D and FIG. 4, FIGS. 3A-3D are photographs illustrating a configuration of and displayed "before and after" performance of an imaging system with a sealed camera housing 212 and an aimed nozzle assembly 210 with laterally offset nozzle 230, in accordance with the present invention. FIG. 4 is a schematic diagram illustrating a fluidic spray 236 from camera housing 212 nozzle assembly 210 with laterally offset nozzle 230, and FIGS. 5A and 5B are schematic diagrams illustrating a perspective view and a side view of a fluid sheet 236 sprayed by an aimed nozzle 230 configured for the method for cleaning the imaging system's exterior objective lens surface 222, in accordance with the present invention.

Figure 3A:
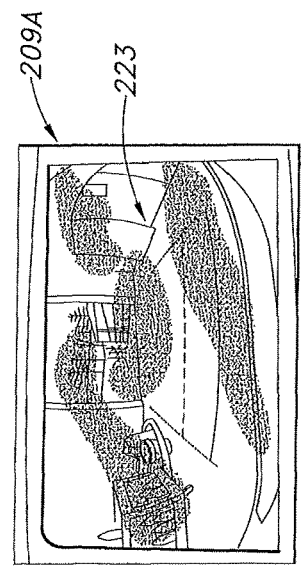
FIGS. 3A-3D are photographs illustrating a configuration of and displayed performance of the imaging system, camera housing and an aimed nozzle assembly, in accordance with the present invention.
Figure 3B:
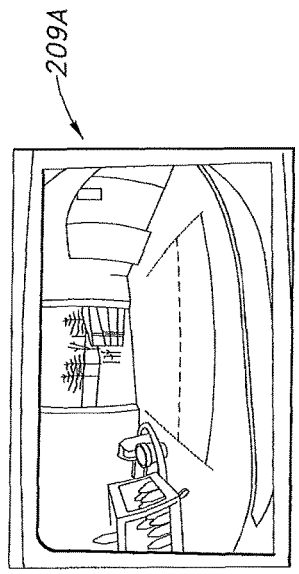
Figure 3C:
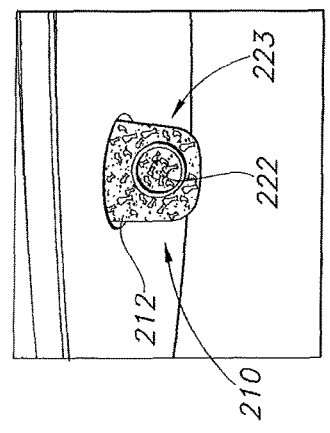
Figure 3D:
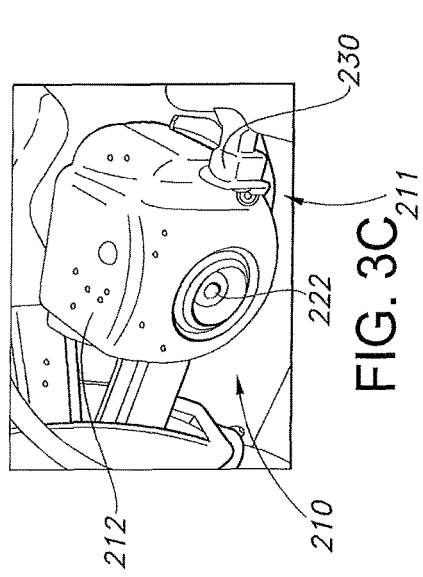

Returning to FIG. 3A, a soiled or dirty objective lens surface 222 has been coated with a representative distribution of "SAE mud", which serves as a standard exemplar of a coating of road grime or debris 223. FIG. 3B is a photograph of the image generated by camera 212 while coated with debris 223 and the debris 223 is clearly obstructing the displayed view 209A as displayed to the user or driver. FIGS. 3C and 3D are photographs illustrating the washing or debris removal effect of the system of the present invention, and illustrate (in FIG. 3C) that debris 223 has been entirely removed from the distal surface of camera housing 212 and lens surface 222 by spray 236. In addition, the user operating the washer system 210 has been able to actuate the system to spray from aimed nozzle 230 while viewing displayed view 209A and so knows when to stop the washing, since debris 223 has been entirely removed from the distal surface of camera housing 212 and is seen to no longer obstruct lens surface 222.

As illustrated in FIGS. 3A-5B, external lens washing system 210 includes a substantially rigid aiming fixture having a distal side and a proximal side and being configured to support and constrain an external lens 222 exposed toward the distal side; the external lens has an external lens surface with a lens perimeter and a lens central axis 250 projecting distally from the lens surface 222, wherein a lens field of view is defined as a distally projecting solid angle (e.g., a truncated pyramid, encompassing the view in display 209A) including the lens central axis 250 and originating within the lens perimeter. Washing system 210 includes at least a first nozzle assembly configured to be supported and aimed toward the external lens 222 by the aiming fixture, and the first nozzle assembly includes a fluid inlet (not shown) in fluid communication with a first laterally offset washing nozzle 230 which projects from the aiming fixture's distal side. The nozzle 230 is configured and aimed to spray washing fluid in a substantially planar sheet 236 having a selected thickness 255 toward the external lens surface 222 and across the field of view, spraying at a first selected spray aiming angle (i.e., preferably spraying in a plane inclined proximally at an angle) of about 1°. The selected aiming angle can be in a range between 1° and 20° (as seen in FIGS. 4 and 5B) relative to a plane tangent to the lens external surface 222. Nozzle 230 is oriented to spray from a selected side, meaning that it is aimed to spray along a first selected spray azimuth angle in relation to a selected fixed reference point or datum 251 on the lens perimeter.

Preferably, lens washing nozzle 230 includes a first fluidic oscillator interaction chamber configured to operate on a selectively actuated flow of pressurized washing fluid flowing through the first oscillator's chamber to generate a first exhaust flow of fluid droplets 236, and the first nozzle assembly's fluid inlet receives pressurized washer fluid and is in fluid communication with the first interaction chamber which passes the pressurized washer fluid distally to the first laterally offset outlet nozzle 230 which is configured to exhaust the washer fluid from the first interaction chamber and generate a first oscillating spray of fluid droplets 236 aimed toward the external lens surface 222 and across the field of view. Preferably that fluidic oscillator is configured as a stepped mushroom fluidic oscillator (as illustrated in FIGS. 12A and 12B). The preferred spray flow rate is approximately 200 ml/min per nozzle at 18 psi, and the spray thickness 255 (i.e., which is seen as thickness in the spray plane transverse to the spray's fan angle plane, as shown in FIG. 5B) is preferably approximately 2 degrees. The oscillating action and large drops generated by the fluidic oscillator aimed by nozzle 230 in this manner were discovered to wet lens surface 222 very rapidly and provided a kinetic impact effect which was found to impact, flood and drive debris 223 as part of a flowing effluent 238 laterally off lens surface 222.

Optionally, laterally offset washing nozzle 230 is configured as a non-oscillating shear nozzle configured to generate a substantially flat fan spray having a selected spray fan angle (e.g., 45° or another angled selected in the range of 15° to) 120°. Alternatively, first laterally offset washing nozzle may be configured as a non-oscillating bug-eye nozzle configured to generate at least one substantially solid fluid jet (i.e., a substantially solid fluid stream having no fan angle).

Preferably, the first laterally offset washing nozzle 230 is configured to aim the spray 236 from a first selected lateral offset distance (from the nozzle's throat or outlet to the center of objective lens' external surface 222) of about 15 mm. The selected lateral offset distance is preferably within the range bounded by 10 mm and 30 mm, in order to keep the entire package as compact as possible.

Some external camera systems include convex or dome-shaped lens surfaces, which can be more difficult to clean. As shown in FIGS. 6A and 6B, the system of the present invention can be configured with plural nozzle assemblies to effectively clean different image sensor housing configurations and different external lens surface shapes. Optionally, as shown in FIGS. 6A and 6B, an external lens washing system 210 of FIG. 3A-5B can include a second nozzle 232 configured to be supported and aimed by the aiming fixture, where the second nozzle 232 is configured and aimed direct a second spray 237 along a second selected spray azimuth angle being radially spaced at a selected inter-spray angle (e.g., 180°) from the first nozzle assembly's spray azimuth angle, aiming second spray 237 to oppose first spray 236.

For the external lens washing system illustrated in FIGS. 6A and 6B, the second nozzle assembly 232 preferably has a second fluidic oscillator interaction chamber configured to operate on a selectively actuated flow of pressurized washing fluid flowing through the second oscillator's chamber to generate the second exhaust flow of fluid droplets 237. Second nozzle assembly 232 receives pressurized washer fluid and is in fluid communication with the second interaction chamber which passes the pressurized washer fluid distally to the second laterally offset nozzle's outlet or throat which is configured to exhaust the washer fluid from the second interaction chamber and generate the second oscillating spray of fluid droplets 237 which is also aimed toward the external lens surface 222 and across the field of view. The second fluidic oscillator is also preferably configured as a stepped mushroom fluidic oscillator.

Impinging fluid jets 236, 237 are aimed to create a specific hydraulic effect and cooperate to distribute fluid across the lens surface in very little time. As the colliding and impinging fluid jets 236, 237 impact debris 223 (not shown) and the lens surface the provided a kinetic impact effect which was found to dislodge, dissolve and drive debris as a turbulent flowing effluent 238 laterally off lens surface 222. The preferred spray flow rate for each nozzle 230, 232 is approximately 200 ml/min per nozzle at 18 psi, and the spray thickness 255 (i.e., which is seen as thickness in the spray plane transverse to the spray's fan angle plane, as shown in FIGS. 5B and 6B) is preferably approximately 2 degrees.

Optionally, second laterally offset washing nozzle 232 is configured as a non-oscillating shear nozzle configured to generate a substantially flat fan spray having a selected spray fan angle (e.g., 45° or another angled selected in the range of 15° to 120°). Alternatively, second laterally offset washing nozzle 232 may be configured as a non-oscillating bug-eye nozzle configured to generate at least one substantially solid fluid jet (i.e., a substantially solid fluid stream having no fan angle).

Preferably, the second laterally offset washing nozzle 232 is configured to aim the spray 237 from a first selected lateral offset distance (from the nozzle's throat or outlet to the center of objective lens' external surface 222) of about 15 mm. The selected lateral offset distance is preferably within the range bounded by 10 mm and 30 mm, in order to keep the entire washing system's package as compact as possible.

Figure 7:
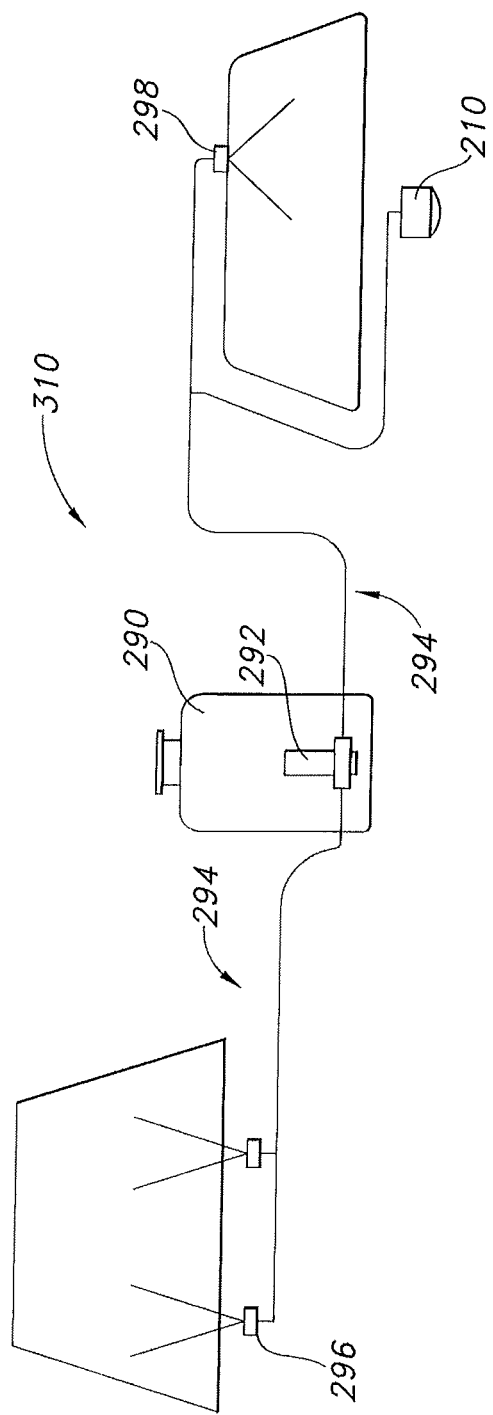
FIG. 7 is a schematic diagram illustrating another automotive imaging system with a camera washing nozzle assembly configured for use with the remote control method for cleaning the imaging system's exterior objective lens surface, in accordance with the present invention.

Turning now to system diagrams 7 and 8, The lens washing system of the present invention is readily integrated into standard equipment already specified for inclusion in many automobiles and other vehicles (e.g., 8). As best seen in FIG. 7, vehicles (e.g., 8) configured with an existing windshield washing system ("front wash") or rear window washing system ("rear wash") require use of a washing fluid reservoir and pumping system to provide a supply of pressurized washing fluid. Washer tank or reservoir 290 typically includes an internal pump 292 which is activated to draw washing fluid from the reservoir 290 and supply pressurized fluid to a conduit network 294 (e.g., comprising lumens, tubes or hoses) which supply the windshield washing nozzles 296 and rear window washing nozzle(s) 298. In accordance with one embodiment of the present invention, the system of the present invention (e.g., 110 or 210) actuates lens washing in response to driver control input or automatically. In automatic operation, lens washing is initiated or triggered in response to the driver's use of the windshield washing system or "front wash" (e.g., where lens washing happens every time the windshield is sprayed with front wash nozzle 296 or alternatively, lens wash may be selectively actuated periodically, with one momentary lens wash cycle for every 3-5 front wash events). Similarly, rear window or liftgate/backlight cleaning can be linked to the lens washing for a back-up camera system wherein backup camera lens washing happens every time the rear window is sprayed with rear wash nozzle 298 or alternatively, a backup camera lens wash may be selectively actuated periodically, with one momentary lens wash cycle for every 3-5 rear wash events.

Alternatively, camera lens washing may be user-controlled using an interior display (e.g., 9a) wherein remotely controllable system 310 includes at least one nozzle assembly 210 and configured to clean the external image sensor's objective lens surface and washing off accumulated image distorting debris 223 uses the display mounted within the vehicle's interior 9A connected to the vehicle's data communication network to receive image signals for display to the driver. The external image sensor is configured to generate an external image display the sensor's external objective lens surface 222 is aimed toward the vehicle's exterior (e.g., rear, front or to the sides of vehicle 8) and the sensor or camera has a selected field of view. The image sensor being substantially exposed to the ambient environment and accumulated image distorting debris when the vehicle is in use. The image sensor lens washing system is configured with laterally offset washing nozzle 230 to selectively spray washing fluid onto the image sensor's objective lens surface at a narrow, glancing angle, the spray being aimed across the field of view along an aiming angle which is aimed at a selected aiming angle that within the range bounded by 1° and 20° in relation to the external objective lens surface, and the spray being actuated in response to a momentary wash control signal of a few seconds duration. The washing system actuation switch mounted within the interior of vehicle 8 and is configured to selectively and momentarily generate the wash control signal when actuation of the lens washing system 210 is desired by the driver, while viewing the display 9A.

Figure 8:
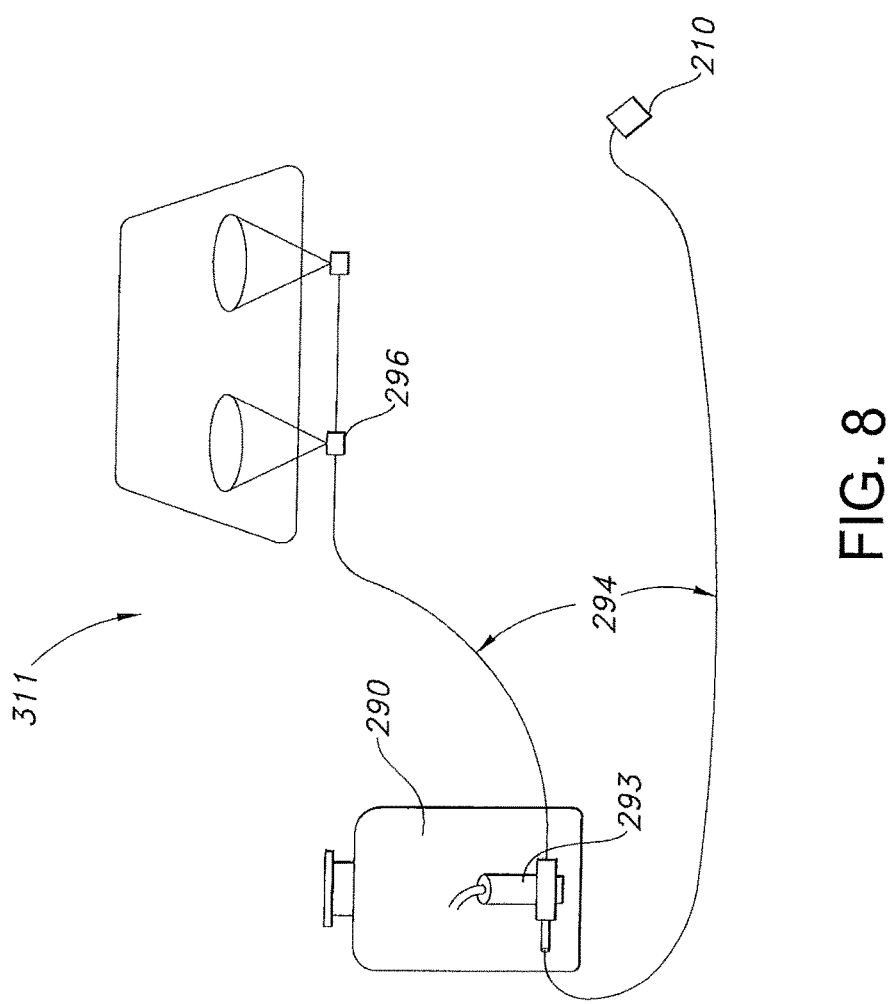
FIG. 8 is a schematic diagram illustrating yet another automotive imaging system configuration with a camera washing nozzle assembly configured for use with the remote control method for cleaning the imaging system's exterior objective lens surface, in accordance with the present invention.

Turning now to FIG. 8, The lens washing system of the present invention is readily integrated into standard equipment already specified for inclusion in many automobiles and other vehicles (e.g., 8). A vehicles (e.g., 8) configured with a front wash system also requires use of a washing fluid reservoir and pumping system to provide a supply of pressurized washing fluid. Washer tank or reservoir 290 has an internal dual outlet pump 293 which is activated to draw washing fluid from the reservoir 290 and supply pressurized fluid to a conduit network 294 (e.g., comprising lumens, tubes or hoses) which supply the windshield washing nozzles 296 and via a rear or secondary outlet conduit, supplies camera washing system 210. Pressurized fluid transmission to camera system 210 may be controlled either by selective actuation of pump 293 or by control of one or more valves (not shown) placed to either allow or stop washer fluid flow to lens washing assembly 210.

In accordance with another embodiment of the system of the present invention, lens washing system 311 is actuated in response to driver control input or automatically. In automatic operation, lens washing is initiated or triggered in response to the driver's use of the windshield washing system or "front wash" (e.g., where lens washing happens every time the windshield is sprayed with front wash nozzle 296 or alternatively, lens wash may be selectively actuated periodically, with one momentary lens wash cycle for every 3-5 front wash events).

Alternatively, for system 311, as illustrated in FIG. 8, camera lens washing may be user-controlled using an interior display (e.g., 9a) wherein remotely controllable system 311 includes at least one nozzle assembly 210 and configured to clean the external image sensor's objective lens surface and washing off accumulated image distorting debris 223 uses the display mounted within the vehicle's interior 9A connected to the vehicle's data communication network to receive image signals for display to the driver. The external image sensor is configured to generate an external image display the sensor's external objective lens surface 222 is aimed toward the vehicle's exterior (e.g., rear, front or to the sides of vehicle 8) and the sensor or camera has a selected field of view. The image sensor being substantially exposed to the ambient environment and accumulated image distorting debris when the vehicle is in use. The image sensor lens washing system is configured with laterally offset washing nozzle 230 to selectively spray washing fluid onto the image sensor's objective lens surface at a narrow, glancing angle, the spray being aimed across the field of view along an aiming angle which is aimed at a selected aiming angle that within the range bounded by 1° and 20° in relation to the external objective lens surface, and the spray being actuated in response to a momentary wash control signal of a few seconds duration. The washing system actuation switch mounted within the interior of vehicle 8 and is configured to selectively and momentarily generate the wash control signal when actuation of the lens washing system 210 is desired by the driver, while viewing the display 9A.

Figure 9:
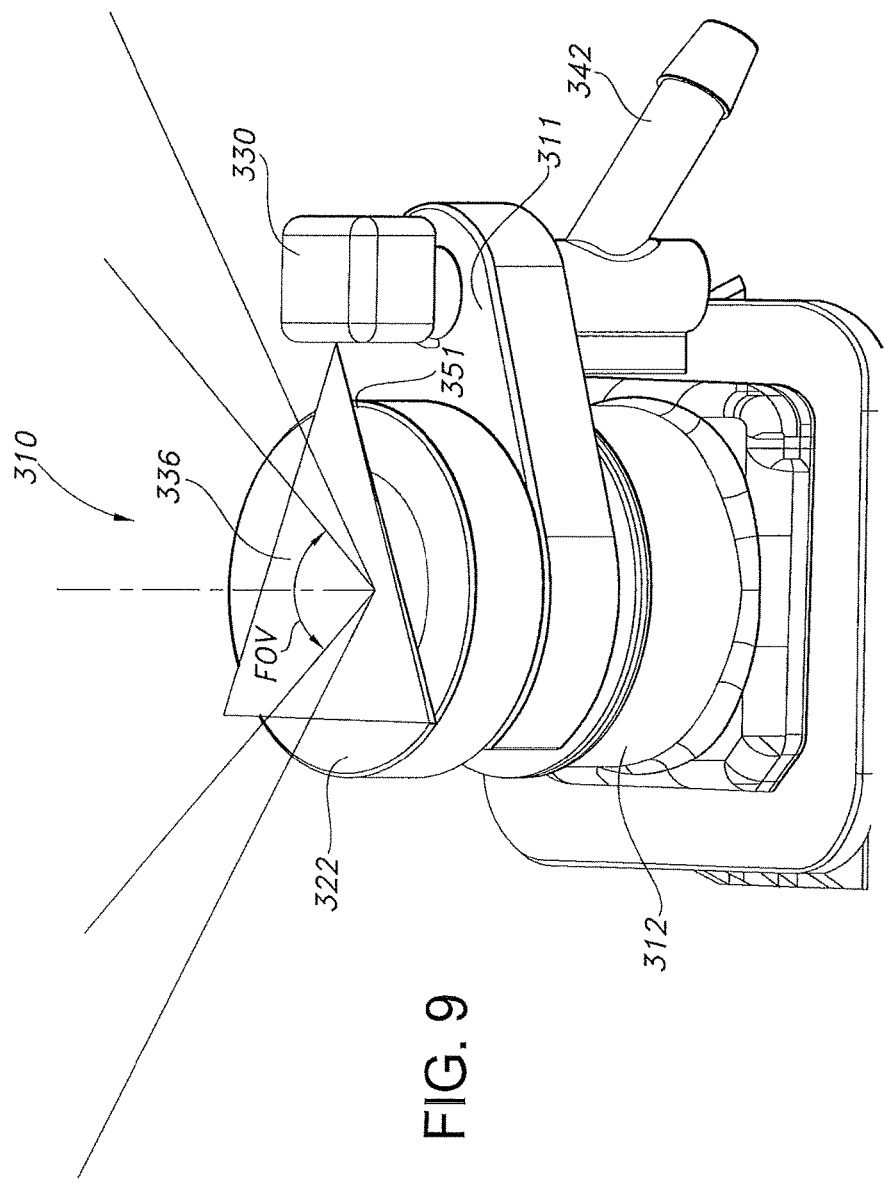
FIG. 9 is a perspective view illustrating aimed spray orientation for another camera nozzle assembly configured for use with the method for cleaning the imaging system's exterior objective lens surface, in accordance with the present invention.
Figure 10:
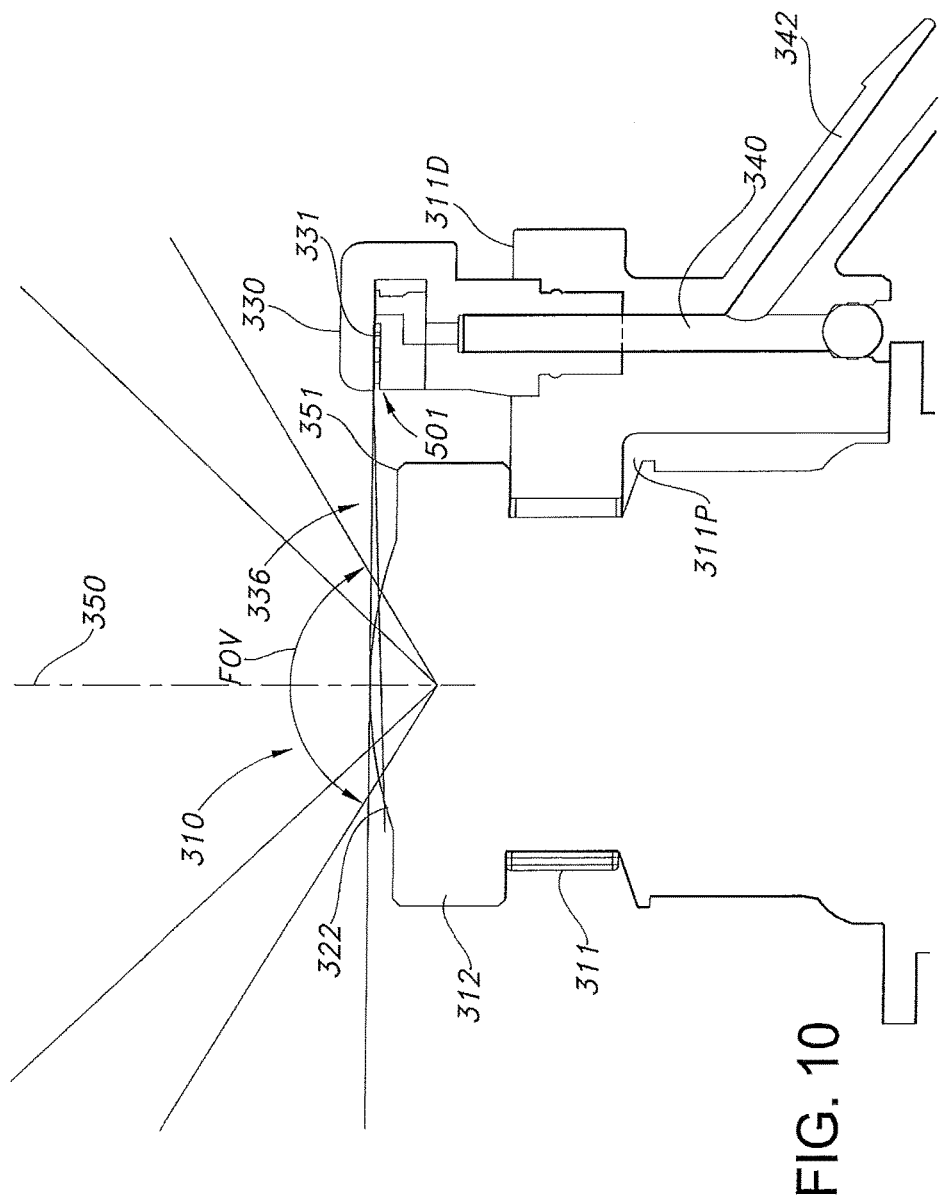
FIG. 10 is a side view illustrating aimed spray fan angle and incidence angle for the system and nozzle assembly of FIG. 9, in accordance with the present invention.
Figure 11:
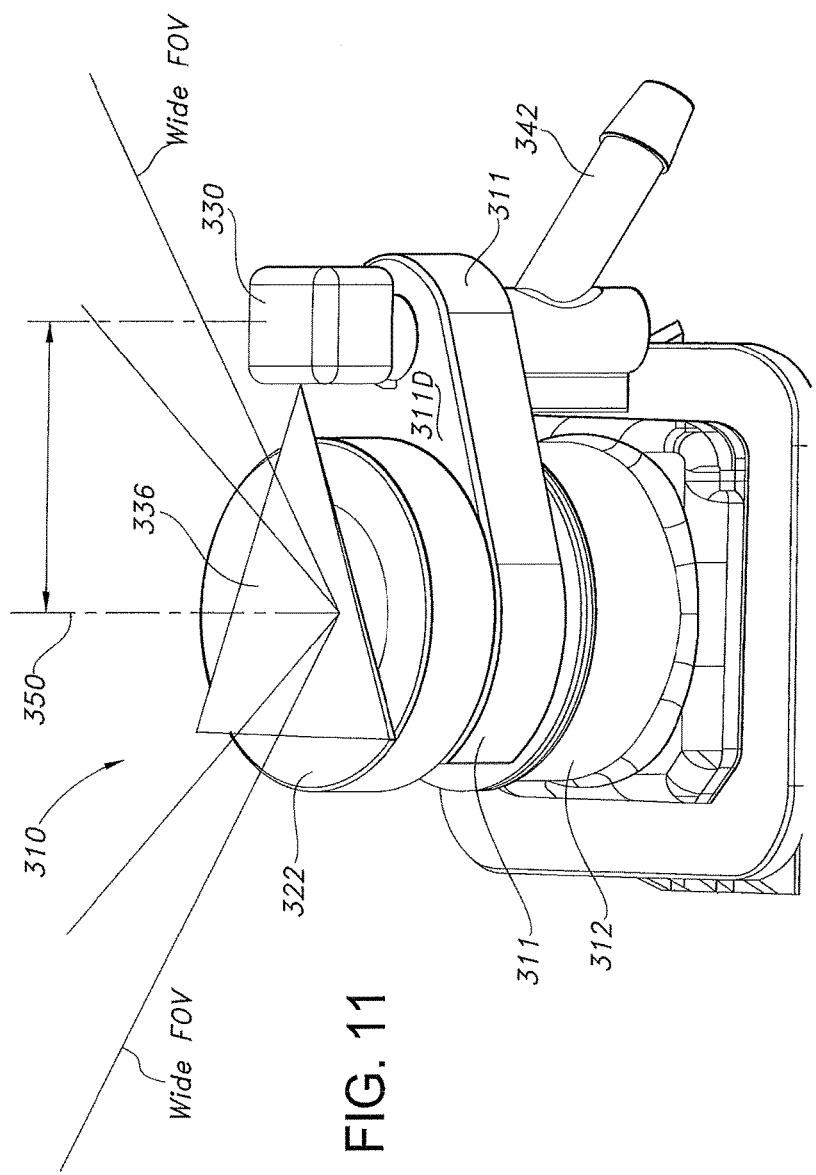
FIG. 11 is a perspective view illustrating range of fluidic oscillator nozzle mounting distances for the system and nozzle assembly of FIGS. 9 and 10, in accordance with the present invention.

Turning now to FIGS. 9-11, a bracket indexed external lens washing system 310 is illustrated. As illustrated in FIG. 9, external lens washing system 310 includes a substantially rigid aiming bracket or fixture 311 having a distal side 311D and a proximal side 311P (best seen in the cross section view of FIG. 10). Fixture or bracket 311 is a rigid durable support fabricated and configured to support camera module 312 and thus orients and constrains the camera's external lens which is exposed toward the distal side of assembly 310. The camera's lens has an external lens surface 322 with a lens perimeter and a lens central axis 350 projecting distally from the lens surface 322, and the lens field of view is defined as a distally projecting solid angle (e.g., a truncated cone or pyramid, generating an image signal having, for example, the view in display 209A). The Field of View ("FOV") typically has an angular width of 90° to 170°. The camera or image sensor 312 has a lens central axis 350 centered within the lens perimeter and the lens FOV is typically symmetrical about lens central axis 350.

Washing system 310 includes at least a first nozzle assembly 330 configured to be supported and aimed toward the external lens 322 by the aiming fixture 311, and the first nozzle assembly includes a fluid inlet 342 in fluid communication with first laterally offset washing nozzle 330 which projects above or distally from the aiming fixture's distal side 311D. Laterally offset nozzle 330 is configured and aimed to spray washing fluid in a substantially planar sheet 336 having a selected thickness (e.g., 255) toward external lens surface 322 and across the field of view, spraying at a first selected spray aiming angle (i.e., preferably spraying in a plane inclined proximally at an angle) of about 1°. The selected aiming angle can be in a range between 1° and 20° (as best seen in FIG. 10) relative to a plane tangent to the lens external surface 322. Nozzle 330 is oriented to spray from a selected side, meaning that it is aimed to spray along a first selected spray azimuth angle in relation to a selected fixed reference point or datum 351 on the lens perimeter.

Preferably, lens washing nozzle 330 includes a first fluidic oscillator interaction chamber 331 configured to operate on a selectively actuated flow of pressurized washing fluid flowing through the first oscillator's chamber 331 to generate a first exhaust flow of fluid droplets 336, and the first nozzle assembly's fluid inlet 342 receives pressurized washer fluid (e.g., from reservoir 290) and is in fluid communication via fluid path 340 which passes the pressurized washer fluid distally to the first laterally offset outlet nozzle 330 which is configured to exhaust the washer fluid from the first interaction chamber 331 and generate a first oscillating spray of fluid droplets 336 aimed toward the external lens surface 322 and across the field of view. Preferably the fluidic oscillator including interaction chamber 331 is configured as a stepped mushroom fluidic oscillator (as illustrated in FIGS. 12A and 12B). The preferred flow rate in oscillating spray 336 is preferably approximately 200 ml/min per nozzle at 18 psi, and the spray thickness (i.e., which is seen as thickness in the spray plane transverse to the spray's fan angle plane, as shown in FIGS. 10 and 5B) is preferably approximately 2 degrees. The oscillating action and large drops generated by the fluidic oscillator aimed by nozzle 330 in this manner was discovered to wet lens surface 322 very rapidly and provided a kinetic impact effect which was found to impact, dissolve and drive debris (not shown, but like debris 223) as part of a flowing effluent laterally off lens surface 222.

Optionally, laterally offset washing nozzle 330 may be configured as a non-oscillating shear nozzle configured to generate a substantially flat fan spray having a selected spray fan angle (e.g., 45° or another angled selected in the range of 15° to 120°). Alternatively, first laterally offset washing 33 nozzle may be configured as a non-oscillating bug-eye nozzle configured to generate at least one substantially solid fluid jet (i.e., a substantially solid fluid stream having no fan angle).

Preferably, the laterally offset washing nozzle 330 is configured to aim the spray 336 from a first selected lateral offset distance (from the nozzle's throat or outlet to the center of objective lens' external surface 222, see FIG. 11) of about 15 mm. The selected lateral offset distance is preferably within the range bounded by 10 mm and 30 mm, in order to keep the entire package as compact as possible.

In the embodiment illustrated in FIGS. 9-11 has camera 312 with lens 322, a nozzle 330 mounted distally and aiming spray 336 nearly parallel to the lens 322 and associated bracketing (i.e., fixture 311) that is necessary to hold nozzle 330 in a fixed location relative to the lens both (in lateral offset and azimuth) from the center line of the lens and distally or above the lens. There are several variables to consider when designing for this camera cleaning system and package, including: mounting methods, packaging space, Field of View (FOV) considerations and Adverse System Effect Mitigation. Taking each in turn:

Mounting Methods

The most preferred mounting or attachment method for the nozzle 330 with the camera 312 is on the camera module housing or body, directly. This mounting location assures that no matter where the camera moves, fluid sprayed from the nozzle is always aimed at the right location toward the center of the lens surface. A nozzle mounted separately from the camera could be subject to extra tolerance stackups and become mis-aimed. It is of course, understood that there will be some camera designs that do not allow for direct attachment and will require separate mounting schemes. The basics of good nozzle placement discussed above are the same regardless of attachment method.

Packaging Space

In general, the location of cameras (e.g., 312) in vehicles (e.g., 8) is limited to certain specific regions, due to packaging and line-of-sight objectives. Unfortunately for camera wash nozzle packaging, prime vehicle panel exterior locations also tend to be good for other components like; liftgate handles or lighting components. As a result, these vehicle panel exterior locations have very tight packaging constraints, driving the need for very small nozzles and tight camera-to-nozzle envelopes.

Field of View Considerations

It should be understood that many existing cameras have Field of View Angles from 120 to 170 degrees (e.g., as indicated by radial lines in FIGS. 9-11). A major constraint to system functionality is to have nothing intrude into the displayed field of view of the camera, (e.g., 209A) so that the user is not distracted by the appearance of the lens washing nozzle 330. Thus the nozzle (e.g., 230 or 330) should be laterally positioned such that it is not in the camera FOV. In the illustrated embodiments of the present invention, the nozzle (e.g., 230 or 330) is oriented and aimed from a fixed nearly parallel-to-lens location, to be away from and behind the FOV of the camera. As the camera FOV's approaches and exceeds 180 degrees this will become impossible. However, it will be noted that with these large angles other components in the vehicle will become visible to the camera. It will then be necessary to place the nozzle (e.g., 230 or 330) such that it aligned with the vehicle's other features and is thereby not silhouetted beyond (and so is "hidden" in the clutter of) the vehicle's exterior surface features, minimizing intrusion into "clear" view of the camera. In the embodiment of FIGS. 9-11, nozzle 330 creates a fluid distribution such that the entirety, or as much as possible, of the lens is covered by fluid and impacts the lens at −1 degrees to −20 degrees or so before the nozzle head becomes visible to the camera, ("aim angle"). Another significant advantage to nearly parallel impact of the spray 336 to the lens 322 is that the fluid is fully engaged in pushing the debris off or laterally across the lens, and not in obliquely impact or bouncing off the lens as would be experienced in higher aim angles, with a more direct impingement. As the aim angle increases, the nozzle must be moved distally further and up into the FOV, and farther from the camera, making cosmetically attractive packaging difficult. Therefore, the nozzle should be kept within 10 degrees (aim angle down to the lens) to keep cosmetic packaging reasonable.

In addition to aim angle considerations, the nozzle distance from the center of the lens (as illustrated in FIG. 11) is important. The closer nozzle 330 is to the center of the lens 322, the wider the fluid distribution (and spray fan angle) must be to cover the entirety of the lens. Excessive closeness to the lens center is objectionable for a number of reasons. Firstly, the nozzle is simply too close to the camera body and may crash with it physically. Secondly, the wider the distribution angle (or spray fan angle) needs to be to get good coverage. Wider spray fan angles spread a relatively small fluid flow rate over a larger lens cleaning area, which could result in the need for a different distribution geometry or higher flow rates. Applicants have found that with one effective distribution geometry, the lateral offset distance is preferably between 18 mm and 28 mm. This lateral offset is approximate, as aim angle and nozzle distal height variations tend to complicate the geometry.

Adverse System Effect Mitigation

Addition of cleaning systems (e.g., 310) to vehicle systems can be accomplished in a number of ways. They can be tied into existing systems, like rear glass cleaning in an SUV, whereby the camera is cleaned whenever the rear glass is cleaned and vice-a-versa. Systems can also be designed such that cleaning in on-demand, and requires the addition of a pump (e.g. 292) and controller or control system (e.g., 9B) programmed to perform the method steps described above. However, it is highly preferable to keep the same number and size of the washer fluid reservoir (s) (e.g., 290). It is highly unlikely that a second reservoir or fluid bottle would be added to vehicle 8, thus the camera cleaning nozzle system (e.g., 310) is likely to be seen as a parasitic system with regard to overall vehicle performance. Since vehicle packaging generally does not allow for larger washer reservoirs, any camera cleaning system must consume as little fluid as possible to have the least impact on the overall vehicle performance.

Since minimizing the overall effect of the addition of the lens washer system (e.g., 310) to the systems of vehicle 8 is desired, a small flow rate is preferred for the nozzle (e.g., 330). One embodiment used a fluidic nozzle with a target flow rate of 200+/−40 mL/min @ 18 PSI and this was shown to be very effective in cleaning the lens 322 with the aforementioned packaging guidelines. With these flow and packaging considerations in mind, the stepped mushroom circuit of FIGS. 12A and 12B was chosen for the preferred fluid delivery geometry embodiment of FIGS. 9-11. This fluidic circuit (e.g., with stepped mushroom chip 501) is capable of performing well in cold weather conditions with 0.06 mm step and allows for very small packaging at 5 mm×5 mm for a 200 mL/min flow rate and 50° spray fan angle for spray 336. Most importantly, this design can maintain a minimum 0.014" power nozzle dimension which is required for good clog resistant performance. Power nozzles smaller than this risk clogging in automotive situations. The fluidic circuit has also been provided with internal filters (e.g., posts 522). Additionally, this circuit design allows for a small interaction region 331, approximately 3.3 mm×2.5 mm, helping to support fan angles as high as 50 degrees and still staying within the target packaging space.

The lens washer nozzle assemblies (e.g., 110, 210, 310 or 610) preferably a include fluidic oscillators as part of a nozzle assembly and preferably a stepped mushroom fluidic oscillator as described in commonly owned U.S. Pat. No. 7,267,290, the entirety of which is incorporated herein by reference. Referring again to FIGS. 12A and 12B, the lens washer nozzle fluidic oscillator is optionally configured as a removable fluidic chip 501 having an oscillating chamber defined between the fluid impermeable surfaces of chip 501 and the nozzle assembly's chip-receiving interior surfaces (as seen in section in FIG. 10). Referring again to FIGS. 10, 12A and 12B the fluidic oscillator with interaction chamber 331 as configured in nozzle assembly 310 is suitable for use at colder temperatures for an exhaust flow in the form of oscillating spray of fluid droplets 336 and has a pair of power nozzles 514 configured to accelerate the movement of the pressurized fluid, a fluid pathway that connects and allows for the flow of pressurized fluid between its inlet 512 and the power nozzles 514, an interaction chamber 518 which is attached to the nozzles and receives the flow from the nozzles, a fluid spray outlet 520 from which the spray exhausts from the interaction chamber, and a flow instability generating structural feature for increasing the instability of the fluid's flow from the power nozzles, with this structural feature being situated in a location chosen from the group consisting of a location within the fluid pathway or proximate the power nozzles. The flow instability generating feature preferably comprises a protrusion that extends inward from each sidewall 506 of the fluid pathway so as to cause a flow separation region downstream of the protrusions, but may comprise a step 524A in the height elevation of the floor of the power nozzles 514 with respect to that of the interaction chamber, as best seen in FIG. 12B.

Figure 13A:
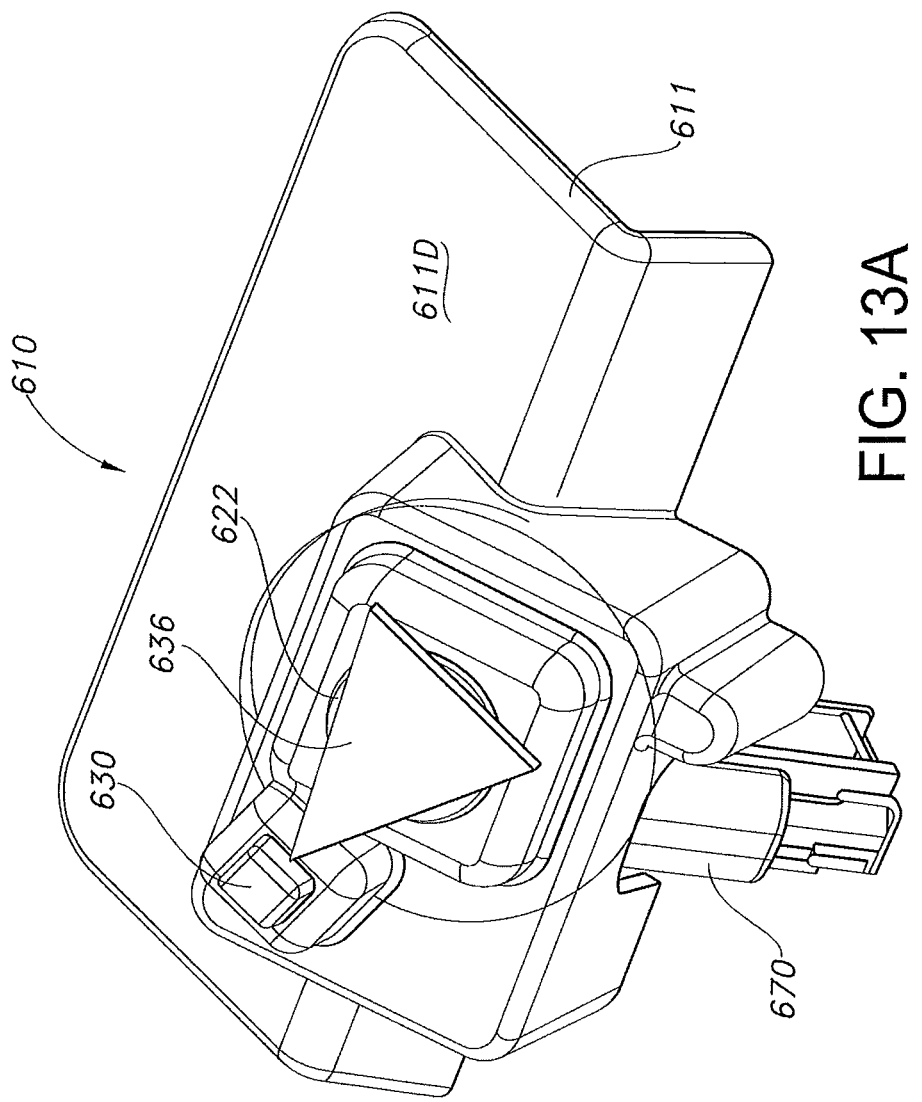
FIGS. 13A-13C illustrate another embodiment for the external lens washing system and nozzle assembly of the present invention.
Figure 13B:
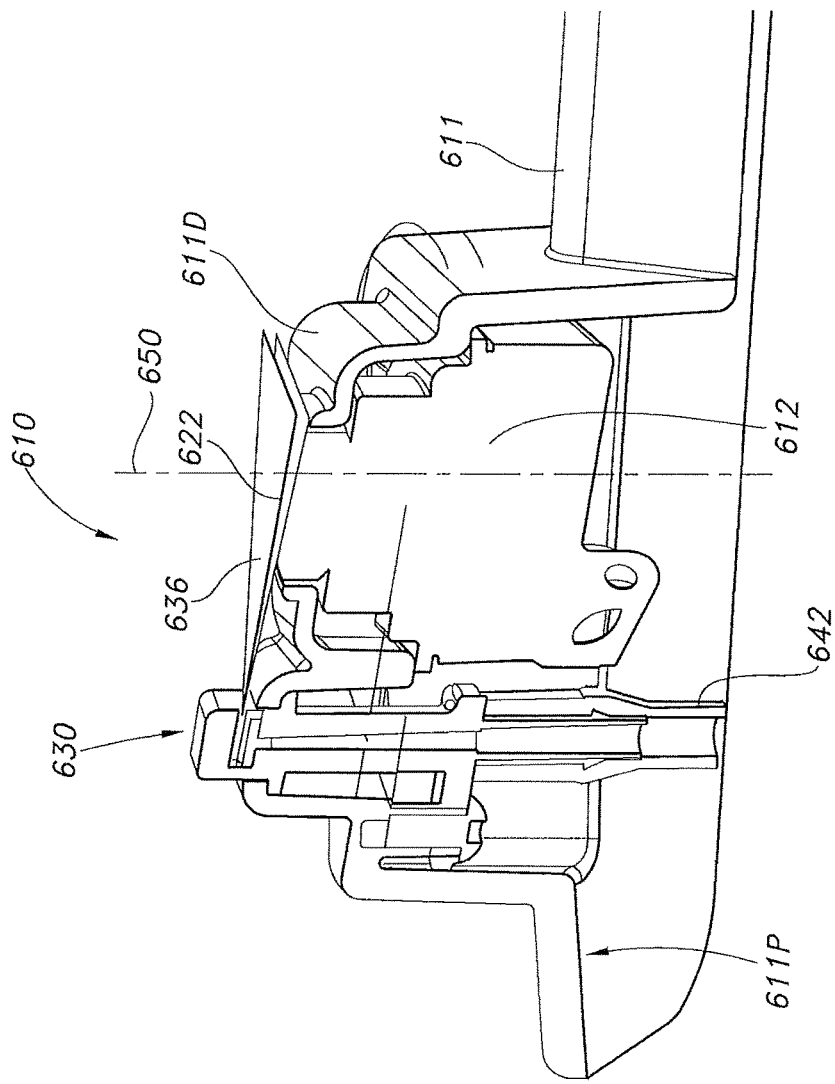
Figure 13C:
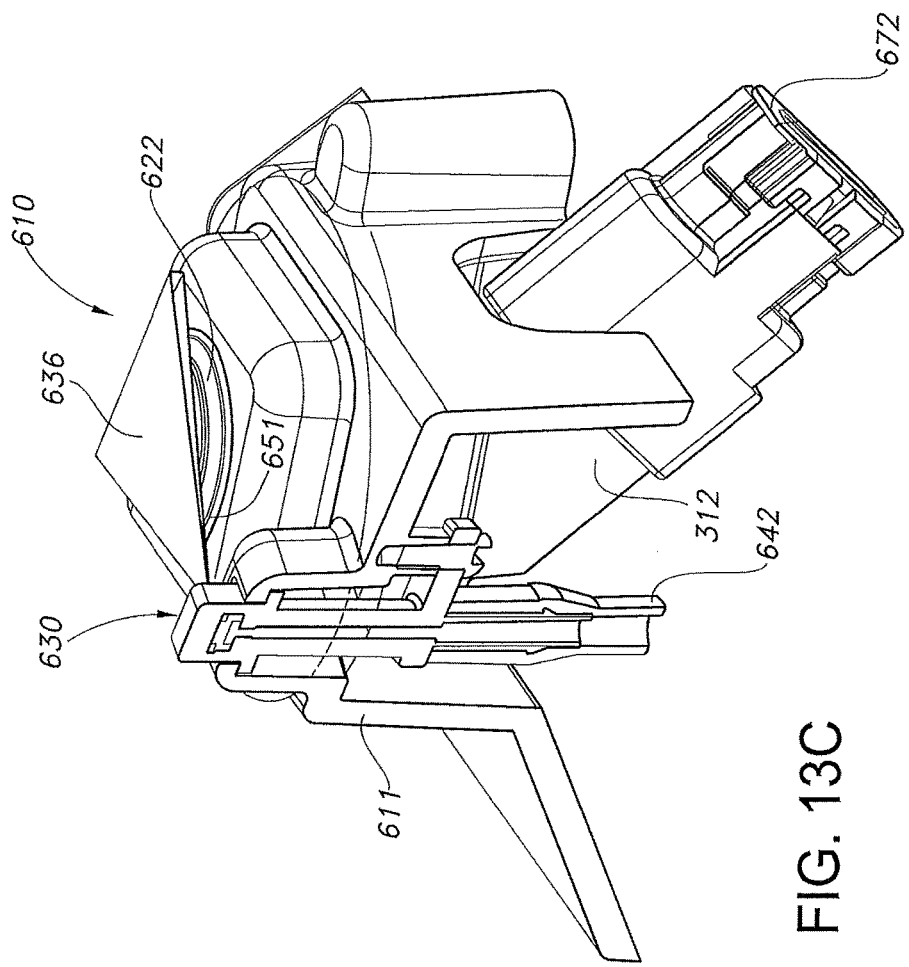

Turning now to FIGS. 13A-C, another embodiment for the external lens washing system and nozzle assembly 610 includes a substantially rigid bezel or aiming fixture 611 having a distal side 611D and a proximal side 611P. Bezel or fixture 611 is configured to support an image sensor or camera 612 and constrain the camera's external lens exposed toward the distal side; the external lens has an external lens surface 622 with a lens perimeter and a lens central axis 650 projecting distally from the lens surface 222, wherein a lens field of view is defined as a distally projecting solid angle (e.g., a truncated cone or pyramid, encompassing the view in display 209A) including the lens central axis 650 and originating within the lens perimeter.

Washing system 610 includes at least a first nozzle assembly configured to be supported and aimed toward the external lens 622 by the bezel or aiming fixture 611, and the first nozzle assembly includes a fluid inlet 642 in fluid communication with a first laterally offset washing nozzle 630 which distally projects from the aiming fixture's distal side 611D. The nozzle 630 is configured and aimed to spray washing fluid in a substantially planar sheet 636 having a selected thickness toward the external lens surface 622 and across the field of view, spraying at a first selected spray aiming angle (i.e., preferably spraying in a plane inclined proximally at an angle) of about 1°. The selected aiming angle can be in a range between 1° and 20° (as seen in FIGS. 13B, 13C and 5B) relative to a plane tangent to the lens external surface 622. Nozzle 630 is oriented to spray from a selected side, meaning that it is aimed to spray along a first selected spray azimuth angle in relation to a selected fixed reference point or datum 651 on the lens perimeter.

Preferably, lens washing nozzle 630 includes a first fluidic oscillator interaction chamber 631 configured to operate on a selectively actuated flow of pressurized washing fluid flowing through the first oscillator's chamber to generate a first exhaust flow of fluid droplets 636, and the first nozzle assembly's fluid inlet 642 receives pressurized washer fluid and is in fluid communication with the first interaction chamber 631 which passes the pressurized washer fluid distally to the first laterally offset outlet nozzle 630 which is configured to exhaust the washer fluid from the first interaction chamber and generate a first oscillating spray of fluid droplets 636 aimed toward the external lens surface 622 and across the field of view. Preferably, as noted above, that fluidic oscillator is configured as a stepped mushroom fluidic oscillator (as illustrated in FIGS. 12A and 12B). The preferred spray flow rate is approximately 200 ml/min per nozzle at 18 psi, and the spray thickness (i.e., which is seen as thickness in the spray plane transverse to the spray's fan angle plane, as shown in FIG. 5B) is preferably approximately 2 degrees. The oscillating action and large drops generated by the fluidic oscillator aimed by nozzle 630 in this manner were discovered to wet lens surface 622 very rapidly and provided a kinetic impact effect which was found to impact, dissolve and drive debris (e.g., like 223, not shown) as part of a flowing effluent laterally off lens surface 622.

Optionally, laterally offset washing nozzle 630 is configured as a non-oscillating shear nozzle configured to generate a substantially flat fan spray having a selected spray fan angle (e.g., 45° or another angled selected in the range of 15° to 120°. Alternatively, first laterally offset washing nozzle may be configured as a non-oscillating bug-eye nozzle configured to generate at least one substantially solid fluid jet (i.e., a substantially solid fluid stream having no fan angle).

Preferably, the first laterally offset washing nozzle 630 is configured to aim the spray 636 from a first selected lateral offset distance (from the nozzle's throat or outlet to the center of objective lens' external surface 622) of about 15 mm. The selected lateral offset distance is preferably within the range bounded by 10 mm and 30 mm, in order to keep the entire package as compact as possible.

The camera lens washing assembly 610 illustrated in FIGS. 13A-13C is preferably is configured as an integrated automotive camera module and nozzle assembly, with 612 camera module and the aimed nozzle assembly integrally packaged as a one-piece unitary module configured for assembly into a vehicle 8. Substantially fluid impermeable camera module 612 is affixed within bezel or housing 611 and has an interior configured to enclose and aim an imaging sensor having an objective lens and a pixelated image sensor array (e.g., like 18), where bezel or housing 611 is configured to support and aim the camera module 612. Camera module 612 comprises a self-contained and sealed module enclosing the image sensor array (e.g., like 18) and associated image signal processing components (e.g., as illustrated in FIG. 1D), and is substantially sealed to limit or substantially preclude water intrusion into the camera module's interior volume. Camera module 612 and integral housing 611 are configured to be positioned at or affixed upon vehicle 8 as a camera lens and lens washer unit 610. Camera module 612 also includes an electrical connector 670 suitable for electrically conductive connection to a vehicle electrical connector when the camera module housing is positioned at the vehicle 8. The camera module's electrical connector extends to be accessible at a proximal end 672 for connecting to the vehicle electrical connector (or vehicle controller 9B) when the camera module is positioned at the vehicle 8 and camera module 612 is responsive to vehicle controller 9B to process video images captured by the imaging sensor.

In accordance with the present invention, an integrated automotive system, fluidic circuit nozzle assembly (e.g., 210, 310 or 610) are useful in the practicing method for aiming an oscillating spray to clean an exterior objective lens surface and allows the driver to determine when to clean a soiled external-view camera's objective lens, so the driver can ensure that the lens is adequately cleaned before moving.

In the lens cleaning system of the present invention, low flow rate fluidic circuit nozzles may be configured to effect bottle cleanings savings, conservation of fluid, and conservation of pressure. Conservation of pressure is especially important when the camera lens cleaning system is integrated into an existing front wash system, where the camera lens washing system must function without detrimentally affecting front glass cleaning, especially under dynamic driving conditions, where the front glass cleaning system's performance is highly sensitive to fluid pressure. The system and method of the present invention is not limited to use with low flow rate nozzles exclusively. Applicants have prototyped a relatively high flow rate nozzle assembly on an exemplary system and it works well, although the camera's image is somewhat compromised when washing. It appears that the low flow rate is best accomplished thru a selected fluidic circuit geometry which allows washing fluid, since droplet size should remain larger when compared to a shear nozzle's non-oscillating spray.

The optimum lens washing nozzle location of the present invention presents a very nicely distributed oscillating spray pattern with the following benefits:

Allows for nearly flush mounting to the camera lens, means the package does not get longer and interfere, or interfere as much, with camera viewing angles as a directed impact nozzle would; and can be packaged in really close to keep the overall width of the package from growing larger; e.g., a dome-shaped or convex ("bug-eye") lens would likely need to have the nozzle spray originate above the lens, angled down, and pushed away from the center line to avoid sight lines, although this would result in a wider and longer package.

The applicants have found that directly spraying nearly parallel to the objective lens assembly's external surface results in less washing fluid (e.g., water) remaining on the lens after conclusion of spraying, preventing water droplets from forming on the lens and obstructing the view, whereas, in prototype development experiments, a more nearly on-lens axis or direct impingement spray method is likely to leave view-obstructing droplets behind.

Having described preferred embodiments of a new and improved lens cleaning system and method, it is believed that other modifications, variations and changes will be suggested to those skilled in the art in view of the teachings set forth herein. It is therefore to be understood that all such variations, modifications and changes are believed to fall within the scope of the appended claims which define the present invention.

We claim:

1. An integrated automotive camera module and nozzle assembly, said camera module and nozzle assembly comprising:
    a substantially fluid impermeable camera module within a housing having an interior configured to enclose and aim an imaging sensor having an objective lens and a pixelated image sensor array, said housing being configured to support and aim the camera module;
    wherein said camera module comprises a self-contained and sealed module enclosing said image sensor array and associated image signal processing components, said camera module being substantially sealed to limit or substantially preclude water intrusion into said camera module, and wherein said camera module housing is configured to be positioned at the vehicle as a unit;
    wherein said camera module also includes an electrical connector suitable for electrically conductive connection to a vehicle electrical connector when said camera module housing is positioned at the vehicle;
    wherein said camera module includes an objective lens and the camera module is supported within said housing with said image sensor having a field of view through said objective lens;
    wherein said electrical connector extends to be accessible at a proximal end for connecting to the vehicle electrical connector when said camera module is positioned at the vehicle; and wherein said camera module is responsive to a vehicle controller operable to process video images captured by said imaging sensor;
    said housing further includes an integral nozzle assembly including a fluid inlet in fluid communication with a laterally offset washing nozzle configured and aimed to spray washing fluid toward said objective lens and across said image sensor's field of view, spraying at a narrow, glancing aiming angle which is aimed at a selected angle that within the range bounded by 1° and 20° in relation to the objective lens external surface; and
    wherein said housing's laterally offset washing nozzle is configured to aim said laterally offset washing nozzle from a selected lateral offset distance from said objective lens external surface and wherein said selected lateral offset distance from said objective lens external surface is within the range bounded by 10 mm and 30 mm,
    wherein said vehicle controller is configured and connected to receive an image signal from said image sensor and generate a displayed image signal in response thereto,
    wherein said camera module includes a distal transparent cover proximate said objective lens for receiving an image therethrough, and wherein said distal transparent cover is sealed to said camera module; and
    wherein said laterally offset nozzle is configured and aimed to spray washing fluid onto said housing's transparent cover portion and across said field of view.

2. The integrated automotive camera module and nozzle assembly claim 1, further including:
    a washer system control input operable to selectively and momentarily actuate the spray of washing fluid by generating a lens wash control signal for a selected duration, and
    a washer fluid flow control mechanism configured to control flow of washer fluid from a washer fluid reservoir and in fluid communication with said housing's fluid inlet.

3. The integrated automotive camera module and nozzle assembly claim 2, wherein said washer fluid flow control system comprises a pump in fluid communication with said reservoir and said housing's fluid inlet and configured to be responsive to said lens wash control signal.

4. The integrated automotive camera module and nozzle assembly claim 2, wherein said washer fluid flow control system comprises a valve in fluid communication with said reservoir and said housing's fluid inlet and configured to be responsive to said lens wash control signal.

5. The integrated automotive camera module and nozzle assembly claim 1, wherein said housing includes a first housing portion comprising a generally cylindrical portion that at least partially accommodates said objective lens.

6. The integrated automotive camera module and nozzle assembly claim 2, wherein said washer system control input is configured and operable to actuate said spray while the driver views video images captured by said image sensor.

7. The integrated automotive camera module and nozzle assembly of claim 2, wherein said housing's integral nozzle assembly is defined within a substantially fluid impermeable enclosed fluid path defining at least one fluidic oscillator interaction chamber configured to operate on a selectively actuated flow of pressurized washing fluid flowing through the oscillator's chamber to generate an exhaust flow of fluid droplets;
    wherein said housing's fluid inlet receives pressurized washer fluid and is in fluid communication with the interaction chamber which passes the pressurized washer fluid distally to at least one laterally offset outlet nozzle configured to exhaust said washer fluid from the interaction chamber and generate an oscillating spray of fluid droplets aimed toward said objective lens and across said image sensor's field of view.

8. The integrated automotive camera module and nozzle assembly of claim 7, wherein said integral nozzle assembly's fluidic oscillator is configured as a stepped mushroom fluidic oscillator.

9. The integrated automotive camera module and nozzle assembly of claim 2, wherein said housing's integral nozzle assembly is defined within a substantially fluid impermeable enclosed fluid path defining at least one fluidic oscillator interaction chamber configured to operate on a selectively actuated flow of pressurized washing fluid flowing through the oscillator's chamber to generate an exhaust flow of fluid droplets;
    wherein said housing's fluid inlet receives pressurized washer fluid and is in fluid communication with the interaction chamber which passes the pressurized washer fluid distally to at least one laterally offset outlet nozzle configured to exhaust said washer fluid from the interaction chamber and generate an oscillating spray of fluid droplets aimed onto said housing's transparent cover portion and across said field of view.

10. The integrated automotive camera module and nozzle assembly of claim 9, wherein said integral nozzle assembly's fluidic oscillator is configured as a stepped mushroom fluidic oscillator.

11. The integrated automotive camera module and nozzle assembly of claim 2, wherein said housing's laterally offset washing nozzle is configured as a non-oscillating shear nozzle configured to generate a substantially flat fan spray having a selected spray fan angle; and wherein said selected spray fan angle is a fan angle within the range bounded by 15° and 120°.

12. The integrated automotive camera module and nozzle assembly of claim 2, wherein said housing's laterally offset washing nozzle is configured as a non-oscillating bug-eye nozzle configured to generate at least one substantially solid fluid jet.

\* \* \* \* \*